United States Patent
Wolf et al.

(10) Patent No.: US 7,356,592 B2
(45) Date of Patent: Apr. 8, 2008

(54) METHOD AND APPARATUS FOR WEB FARM TRAFFIC CONTROL

(75) Inventors: Joel L. Wolf, Katonah, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/057,516

(22) Filed: Jan. 24, 2002

(65) Prior Publication Data

US 2003/0140143 A1 Jul. 24, 2003

(51) Int. Cl.
  *G06F 15/173* (2006.01)
  *G06F 15/16* (2006.01)
(52) U.S. Cl. ..................... 709/226; 709/229
(58) Field of Classification Search .......... 709/225, 709/226, 241, 229; 718/105
See application file for complete search history.

(56) References Cited

U.S. PATENT DOCUMENTS

| | | | | |
|---|---|---|---|---|
| 5,806,065 A * | 9/1998 | Lomet | ............ | 707/8 |
| 5,951,694 A * | 9/1999 | Choquier et al. | ............ | 714/15 |
| 6,092,178 A | 7/2000 | Jindal et al. | | |
| 6,098,093 A * | 8/2000 | Bayeh et al. | ............ | 709/203 |
| 6,112,279 A * | 8/2000 | Wang | ............ | 711/119 |
| 6,119,143 A * | 9/2000 | Dias et al. | ............ | 709/201 |
| 6,185,598 B1 * | 2/2001 | Farber et al. | ............ | 709/200 |
| 6,282,569 B1 * | 8/2001 | Wallis et al. | ............ | 709/224 |
| 6,351,775 B1 * | 2/2002 | Yu | ............ | 709/238 |
| 6,374,297 B1 * | 4/2002 | Wolf et al. | ............ | 709/226 |
| 6,587,970 B1 * | 7/2003 | Wang et al. | ............ | 714/47 |
| 6,611,861 B1 * | 8/2003 | Schairer et al. | ............ | 709/217 |
| 6,633,916 B2 * | 10/2003 | Kauffman | ............ | 709/229 |
| 6,675,264 B2 * | 1/2004 | Chen et al. | ............ | 711/141 |
| 6,697,849 B1 * | 2/2004 | Carlson | ............ | 709/219 |
| 6,728,748 B1 * | 4/2004 | Mangipudi et al. | ............ | 718/105 |
| 6,771,595 B1 * | 8/2004 | Gilbert et al. | ............ | 370/229 |
| 6,772,333 B1 * | 8/2004 | Brendel | ............ | 713/153 |
| 6,779,017 B1 * | 8/2004 | Lamberton et al. | ............ | 709/203 |
| 6,798,747 B1 * | 9/2004 | Watkins et al. | ............ | 370/238 |
| 6,976,077 B1 * | 12/2005 | Lehew et al. | ............ | 709/229 |
| 6,985,956 B2 * | 1/2006 | Luke et al. | ............ | 709/229 |
| 7,000,007 B1 * | 2/2006 | Valenti | ............ | 709/219 |
| 2002/0087679 A1 * | 7/2002 | Pulley et al. | ............ | 709/224 |
| 2002/0198995 A1 * | 12/2002 | Liu et al. | ............ | 709/226 |

(Continued)

OTHER PUBLICATIONS

Monma et al. "Backbone network design and performance . . ."; Selected Areas in Communications, IEEE Journal on, vol. 4, Issue 6, Sep. 1986, pp. 946-965.*

(Continued)

*Primary Examiner*—Andrew Caldwell
*Assistant Examiner*—Michael D. Meucci
(74) *Attorney, Agent, or Firm*—F. Chau & Assocaites, LLC

(57) ABSTRACT

Disclosed is a method for controlling a web farm having a plurality of websites and servers, the method comprising categorizing customer requests received from said websites into a plurality of categories, said categories comprising a shareable customer requests and unshareable customer requests, routing said shareable customer requests such that any of said servers may process shareable customer requests received from different said websites, and routing said unshareable customer requests from specific said websites only to specific servers to which said specific websites have been assigned.

15 Claims, 12 Drawing Sheets

U.S. PATENT DOCUMENTS

2004/0025052 A1* 2/2004 Dickenson ................ 713/201
2005/0198141 A1* 9/2005 Zhu et al. ................. 709/205

OTHER PUBLICATIONS

Jiang et al. "An adaptive network prefetch scheme"; Selected Areas in Communications, IEEE Journal on, vol. 16, Issue 3, Apr. 1998, pp. 358-368.*

Theys et al. "A mathematical model and scheduling . . ."; Parallel and Distributed Systems, IEEE Transactions on, vol. 11, Issue 9, Sep. 2000, pp. 969-988.*

Almeida et al. "Providing differentiated levels . . ."; Computer Sciences Department, University of Wisconsin-Madison, 1997.*

\* cited by examiner

| Web Site | Cluster Servers | | Partition Servers | |
|---|---|---|---|---|
| | Symbol | Number | Symbol | Number |
| circularlogic.com | ◯ | 3 | ● | 2 |
| realsquare.com | ▢ | 3 | ■ | 1 |
| hexnut.com | ⬡ | 2 | ⬢ | 2 |
| baseball.com | ◇ | 2 | ◆ | 1 |
| triangleinequality.com | ◁ | 1 | ◀ | 1 |
| nabla.com | ▷ | 1 | ▶ | 1 |
| football.com | ◯ | 1 | ● | 1 |
| eggcentric.com | ◯ | 1 | ● | 1 |

FIG. 5

METHOD AND APPARATUS FOR WEB FARM TRAFFIC CONTROL

FIELD OF INVENTION

The present invention relates to the balancing of load in web farms.

BACKGROUND OF THE INVENTION

Web farms are now becoming very popular. A key concept behind the web farm is the notion that a number of different websites share pooled resources. They typically share a common front-end dispatcher to perform load control and distribute customer requests. They share the multiple web servers themselves. And they also share back-end bandwidth to return request results to the customers. The hardware and software is typically owned, operated and maintained by a single service provider, or content host. Examples of companies currently providing or planning to provide this service include AT&T, Exodus, Intel, IBM, Qwest, Verio, and Worldcom.

A major performance challenge for web farms is to balance the load on the servers effectively, so as to minimize the average response time achieved on the system. Overutilization of servers can cause excessive delays of customer requests. On the other hand, underutilization of servers is wasteful. Minimizing average response time will have the dual effect of maximizing the throughput the web farm can achieve. This means that the load control procedure in the front-end dispatcher can be made more permissive, rejecting fewer requests.

One of the main motivations for web farms is the efficiencies that arise because of the pooled resources. Each website is assigned to a set of one or more servers. However, the prior art has assumed that the website assignments have been partitioned among the servers: That is, no server handles traffic from more than one website.

The rationale behind creating sets containing multiple servers is feasibility: The distribution of customer requests amongst the various sites will typically be highly non-uniform. Some sites will likely be vastly more popular than others, and the popularity of a hot website will generally be great enough that assigning it to a single server would overload that server. Thus, in order to achieve acceptable performance it will be necessary to assign some sites to multiple servers.

It is known to implement load-balancing algorithms for the partitioned case, but such partitioning of the servers leads to less flexibility and therefore less optimally balanced website load balancing.

SUMMARY OF THE INVENTION

Disclosed is a method for controlling a web farm having a plurality of websites and servers, the method comprising categorizing customer requests received from said websites into a plurality of categories, said categories comprising a shareable customer requests and unshareable customer requests, routing said shareable customer requests such that any of said servers may process shareable customer requests received from different said websites, and routing said unshareable customer requests from specific said websites only to specific servers to which said specific websites have been assigned.

Another aspect of the method comprises a Goal procedure, said Goal procedure comprising determining, for each said customer request, an optimal server from among said servers to which each said customer request is to be assigned so as to minimize an average customer response time at any given moment, given said assignment of said websites to said servers and a current customer request load.

In another aspect of the method, said Goal procedure is effected by minimizing the function $$\sum_{j=1}^{N} R_j \left( \sum_{i=1}^{M} (x_{i,j} + y_{i,j}) \right)$$

is minimized subject to the constraints $\Sigma(x_{i,j}+y_{i,j}) \in \{0, \ldots, L_j\}$, $$\sum_{j=1}^{N} x_{i,j} = c_i, x_{i,j} = 0 \text{ if } a_{ij} = 0, \sum_{j=1}^{N} y_{i,j} = d_i,$$

and $y_{i,j}=0$ if $b_{i,j}=0$, where M is the number of websites, N is the number of servers, $R_j$ is the expected response time as a function of customer arrival rate at server j, $x_{i,j}$ is a decision variable representing the hypothetical number of shareable requests for website i that might be handled by server j, $y_{i,j}$ is a decision variable representing the hypothetical number of unshareable requests for website i that might be handled by server j, $L_j$ is the maximum acceptable load for server j, $c_i$ is the current number of shareable customer requests from website i, $d_i$ is the current number of unshareable requests from website i, $a_{i,j}$ is an index indicating if shareable requests from website i may be routed to server j, and $b_{i,j}$ is an index indicating if unshareable requests from website i may be routed to server j.

Another aspect of the method comprises creating and maintaining a directed graph, said directed graph comprising a dummy node and a plurality of server nodes, each said server node corresponding to one of said servers; designating one of said sever nodes a winning node for which the expression $$R_j \left( \sum_{i=1}^{M} (x_{i,j} + y_{i,j} + 1) \right) - R_j \left( \sum_{i=1}^{M} (x_{i,j} + y_{i,j}) \right)$$

is minimal, and choosing a shortest directed path from said dummy node to said winning node.

Another aspect of the method comprises a Static procedure, said Static procedure comprising assigning specific said websites to specific said servers.

In another aspect of the method, said Static procedure assigns said websites to specific servers based upon forecasted demand for shareable and unsharable customer requests from each said website.

Another aspect of the method comprises a Dynamic procedure, said Dynamic procedure comprising examining the next customer request, invoking said Goal procedure in order to determine which server is the optimal server to currently process said next customer request, and dispatching said next customer request to said optimal server.

Another aspect of the method comprises receiving said customer requests into a queue, and wherein said Dynamic procedure further comprises monitoring said customer requests in said queue, monitoring customer requests currently being processed by said servers, defining, for each $j^{th}$ server, a function $\dot{R}_j(z)$ by setting $\dot{R}_j(z)=R_j(z+\Sigma(\ddot{c}_{i,j}+\ddot{d}_{i,j}))$, defining, for each $j^{th}$ server, a revised acceptable load limit $\dot{L}_j$ by setting $$\dot{L}_j = L_j - \sum_{i=1}^{M}(\ddot{c}_{i,j}+\ddot{d}_{i,j}),$$

and invoking said Goal procedure to utilize said $\dot{R}_j(z)$ function and revised acceptable load limit $\dot{L}_j$ to minimize the function $$\sum_{j=1}^{N}\dot{R}_j\left(\sum_{i=1}^{M}(\dot{x}_{i,j}+\dot{y}_{i,j})\right)$$

subject to the constraints:

$$\sum_{i=1}^{M}(\dot{x}_{i,j}+\dot{y}_{i,j}) \in \{0, \ldots, \dot{L}_j\}, \sum_{j=1}^{N}\dot{x}_{i,j} = \dot{c}_i,$$

$\dot{x}_{i,j}=0$ if $a_{i,j}=0$, $$\sum_{j=1}^{N}\dot{y}_{i,j} = \dot{d}_i,$$

and $\dot{y}_{i,j}=0$ if $b_{i,j}=0$, where $\dot{x}_{i,j}$ is a decision variable representing the hypothetical number of shareable requests in the queue for website i that might be handled by server j, $\dot{y}_{i,j}$ is a decision variable representing the hypothetical number of unshareable requests for website i that might be handled by server j, $\dot{c}_i$ is the current number of shareable customer requests in the queue from website i, $\dot{d}_i$ is the current number of unshareable requests in the queue from website i, $\ddot{c}_i$ is the current number of shareable customer requests from website i currently being processed in one of the servers, and $\ddot{d}_i$ is the current number of unshareable requests from website i currently being processed in one of the servers.

Disclosed is a program storage device readable by machine, tangibly embodying a program of instructions executable by the machine to perform method steps for controlling a web farm having a plurality of websites and servers, said method steps comprising categorizing customer requests received from said websites into a plurality of categories, said categories comprising a shareable customer requests and unshareable customer requests, routing said shareable customer requests such that any of said servers may process shareable customer requests received from different said websites, and routing said unshareable customer requests from specific said websites only to specific servers to which said specific websites have been assigned.

Another aspect of the apparatus comprises a Goal procedure, said Goal procedure comprising determining, for each said customer request, an optimal server from among said servers to which each said customer request is to be assigned so as to minimize an average customer response time at any given moment, given said assignment of said websites to said servers and a current customer request load.

In another aspect of the apparatus, said Goal procedure is effected by minimizing the function $$\sum_{j=1}^{N}R_j\left(\sum_{i=1}^{M}(x_{i,j}+y_{i,j})\right)$$

is minimized subject to the constraints $\Sigma(x_{i,j}+y_{i,j})\in\{0, \ldots, L_j\}$, $$\sum_{j=1}^{N}x_{i,j} = c_i, x_{i,j} = 0 \text{ if } a_{ij}=0, \sum_{j=1}^{N}y_{i,j} = d_i,$$

and $y_{i,j}=0$ if $b_{i,j}=0$, where M is the number of websites, N is the number of servers, $R_j$ is the expected response time as a function of customer arrival rate at server j, $x_{i,j}$ is a decision variable representing the hypothetical number of shareable requests for website i that might be handled by server j, $y_{i,j}$ is a decision variable representing the hypothetical number of unshareable requests for website i that might be handled by server j, $L_j$ is the maximum acceptable load for server j, $c_i$ is the current number of shareable customer requests from website i, $d_i$ is the current number of unshareable requests from website i, $a_{i,j}$ is an index indicating if shareable requests from website i may be routed to server j, and $b_{i,j}$ is an index indicating if unshareable requests from website i may be routed to server j.

Another aspect of the apparatus comprises creating and maintaining a directed graph, said directed graph comprising a dummy node and a plurality of server nodes, each said server node corresponding to one of said servers; designating one of said sever nodes a winning node for which the expression $$R_j\left(\sum_{i=1}^{M}(x_{i,j}+y_{i,j}+1)\right) - R_j\left(\sum_{i=1}^{M}(x_{i,j}+y_{i,j})\right)$$

is minimal, and choosing a shortest directed path from said dummy node to said winning node.

Another aspect of the apparatus comprises a Static procedure, said Static procedure comprising assigning specific said websites to specific said servers.

In another aspect of the apparatus, said Static procedure assigns said websites to specific servers based upon forecasted demand for shareable and unsharable customer requests from each said website.

Another aspect of the apparatus comprises a Dynamic procedure, said Dynamic procedure comprising examining the next customer request, invoking said Goal procedure in order to determine which server is the optimal server to currently process said next customer request, and dispatching said next customer request to said optimal server.

Another aspect of the apparatus comprises receiving said customer requests into a queue, and wherein said Dynamic procedure further comprises monitoring said customer requests in said queue, monitoring customer requests currently being processed by said servers, defining, for each $j^{th}$ server, a function $\dot{R}_j(z)$ by setting $\dot{R}_j(z)=R_j(z+\Sigma(\ddot{c}_{i,j}+\ddot{d}_{i,j}))$, defining, for each $j^{th}$ server, a revised acceptable load limit $\dot{L}_j$ by setting $$\dot{L}_j = L_j - \sum_{i=1}^{M}(\ddot{c}_{i,j}+\ddot{d}_{i,j}),$$

and invoking said Goal procedure to utilize said $\dot{R}_j(z)$ function and revised acceptable load limit $\dot{L}_j$ to minimize the function $$\sum_{j=1}^{N}\dot{R}_j\left(\sum_{i=1}^{M}(\dot{x}_{i,j}+\dot{y}_{i,j})\right)$$

subject to the constraints $$\sum_{i=1}^{M}(\dot{x}_{i,j}+\dot{y}_{i,j}) \in \{0, \ldots, \dot{L}_j\}, \sum_{j=1}^{N}\dot{x}_{i,j}=\dot{c}_i,$$

$\dot{x}_{i,j}=0$ if $a_{i,j}=0$, $$\sum_{j=1}^{N}\dot{y}_{i,j}=\dot{d}_i,$$

and $\dot{y}_{i,j}=0$ if $b_{i,j}=0$, where $\dot{x}_{i,j}$ is a decision variable representing the hypothetical number of shareable requests in the queue for website i that might be handled by server j, $\dot{y}_{i,j}$ is a decision variable representing the hypothetical number of unshareable requests for website i that might be handled by server j, $\dot{c}_i$ is the current number of shareable customer requests in the queue from website i, $\dot{d}_i$ is the current number of unshareable requests in the queue from website i, $\ddot{c}_i$ is the current number of shareable customer requests from website i currently being processed in one of the servers, and $\ddot{d}_i$ is the current number of unshareable requests from website i currently being processed in one of the servers.

Disclosed is a web farm, comprising means for receiving customer requests from customer, means for processing said customer requests to produce responses, means for transmitting said responses to said customers, means for categorizing said customer requests into shareable customer requests and unshareable customer requests, a network dispatcher comprising means for executing a Goal procedure, a Static procedure, and a Dynamic procedure, said Goal procedure comprising determining, for each said customer request, an optimal server from among said servers to which each said customer request is to be assigned so as to minimize an average customer response time at any given moment, given said assignment of said websites to said servers and a current customer request load, wherein said shareable customer requests may be assigned to any said server and wherein said unshareable customer requests may only be assigned to specific servers depending on which said website said unshareable customer request originated, said Static procedure comprising assigning specific said websites to specific said servers, and said Dynamic procedure comprising examining the next customer request, invoking said Goal procedure in order to determine which server is the optimal server to currently process said next customer request, and dispatching said next customer request to said optimal server.

BRIEF DESCRIPTION OF THE DRAWINGS

FIG. 5 is the glossary of the website symbols in an example illustrating the Dynamic procedure.

DETAILED DESCRIPTION OF PREFERRED EMBODIMENTS

Figure 1:
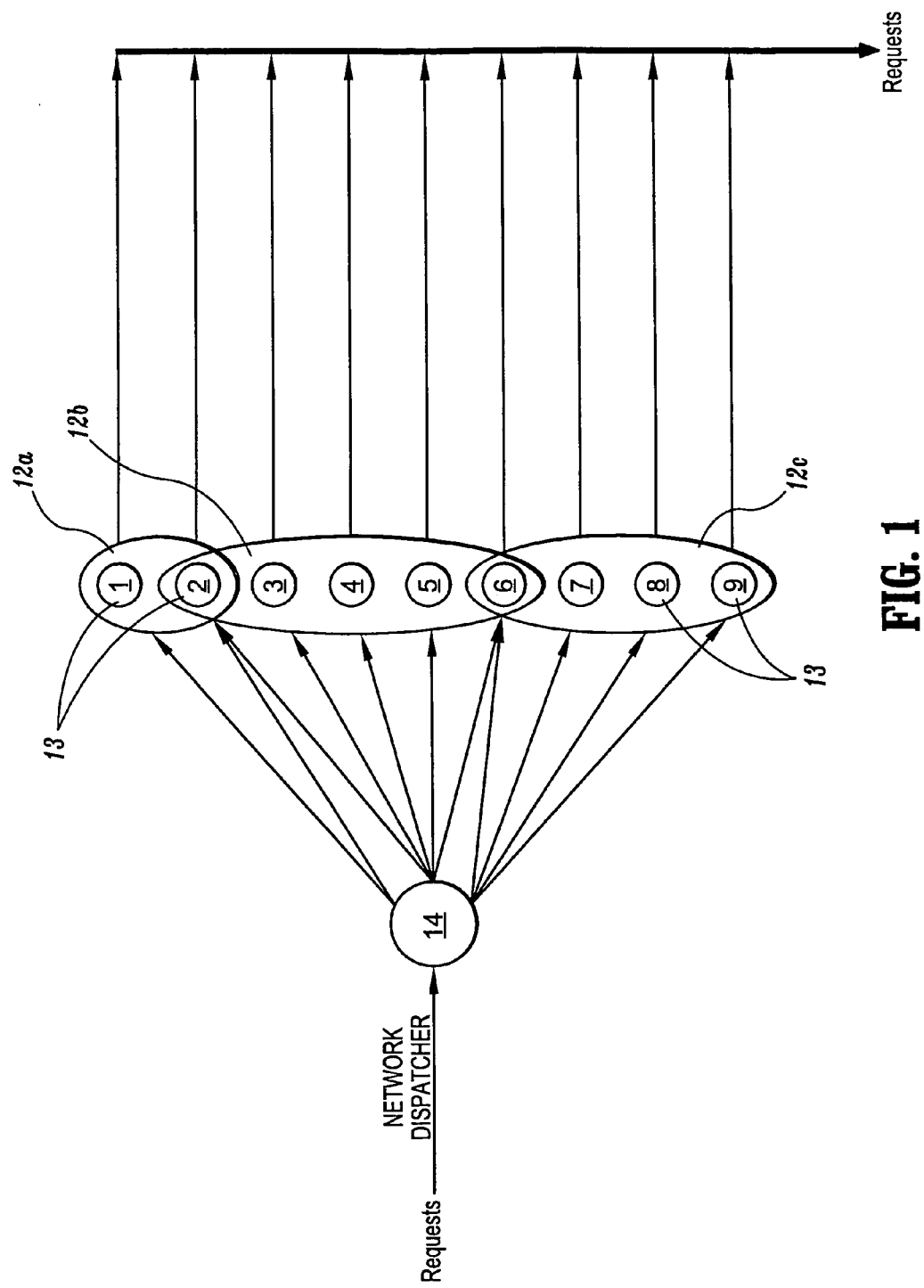
FIG. 1 shows a web farm, including network dispatcher and multiple servers.

The invention to provides a solution to the problem of balancing the load in a web farm by allowing overlaps among the server assignments of multiple sites, and does so in a practical manner, one which is palatable to the owners of the various sites. The teachings of this invention may be used instead of the load-balancing system disclosed in commonly assigned co-pending U.S. patent application Ser. No. 09/374,539, filed Aug. 16, 1999, entitled METHOD AND APPARATUS FOR LOAD BALANCING OF WEB CLUSTER FARMS, the disclosures of which are incorporated by reference herein in their entirety.

The rationale behind overlapping the website sets is flexibility: Web farms must be able to handle customers requests from the many different sites simultaneously, and this customer demand is typically bursty. This burstiness can be seen on a weekly, daily and hourly basis, due to changing website popularity and customer mix. The evidence suggests that it occurs on much smaller atomic time units as well, such as minutes and even seconds. The point here is that the average website access rates do not sufficiently capture the volatile nature of customer behavior. Traffic for one website may ebb and flow dramatically, and one website may be busy when another is less so. The hope is that a server handling several sites can be made to vary the workload balance amongst these sites to react to these dynamic traffic. Note that a partitioned design does not allow this reactive capability.

The invention efficiently pools the server resources and employs intelligent methods for the front-end dispatcher so as to balance the load on those servers. The invention is generalizable enough to assume that each website is assigned to a set of one or more servers, and furthermore that these sets may overlap. This means that a given server may handle customer requests from multiple sites if need be. The less-desirable alternative is to partition the servers amongst the various sites, so that each server handles requests from precisely one website. The invention will work for this less preferred special case as well, though less effectively.

Overlapping sets in the case of web farms is not devoid of problems, however. Although it is reasonable from a technical perspective that a suitably sophisticated server accommodate a modest number of websites, it may not be quite as reasonable from a political perspective. For example, an e-commerce merchant might object to sharing servers handling transaction requests with other merchants, even if the server happens to be logically partitioned amongst the sites. The objection of the merchant will be typically based on privacy grounds. Fortunately, such a merchant would nearly always be less sensitive to sharing servers for browse requests. For a load balancing procedure to be practical and therefore implementable, it must deal effectively with this issue. This may be achieved by dividing the workload of each website into two categories if necessary, one of which is not sharable and the other of which is. This assumes that the public requests (motivated by browsers) can share a server with sharable requests from other sites. They can also share a server with private requests (motivated by transactions) from the same website. This crucial refinement gives the invention the required flexibility to perform well in spite of the politically volatile issue of overlapping assignments.

Though the invention is described herein in terms of two levels of customer traffic, those skilled in the art will appreciate that the invention is generalizable to a hierarchy of levels of traffic, with varying website-to-server restrictions.

Note that, although the public and private categories are motivated by browse and transaction requests, respectively, these terms are actually defined by the ability or inability to share. For e-commerce sites that accept the logical partitioning concept, for example, transaction requests will be counted as part of the public traffic and consequently there will be no private traffic at all. On the other extreme, e-commerce sites that refuse to allow any sharing of servers even for browsers will have browse requests counted as part of the private traffic, and there will be no public traffic at all. Of course, there may be non-commercial sites for which the browse and transaction terms have no literal meaning anyway. For simplicity, traffic will nonetheless be classified into either the public or private categories depending on sharability.

The invention takes advantage of the possibility of overlapping website assignments to balance the web farm load very effectively. The problem decouples naturally into two subproblems, and the solutions to each utilize the same fundamental optimization method to set appropriate goals. Thus, there are three major components to the invention, which will be referred to as the Goal procedure, The Static procedure, and The Dynamic procedure.

The Goal procedure is the key common procedure. It uses an optimization technique designed to minimize the average customer response time at any given moment, given the assignments of sites to servers and the current customer request load. The technique is a slightly special case of one used for solving the so-called discrete class constrained separable convex resource allocation problem, taught by Tantawi et al, *Optimal allocation of multiple class resources in computer systems*, ACM Sigmetrics Conference (May 1988), pp. 253-260, the disclosures of which are incorporated by reference herein in their entirety. So this method will determine the optimal load balancing goals. Specifically, the output is the optimal number of customer requests of both the public and private categories for each website to be handled by each appropriate server, and thus by summation the optimal number of all customer requests per server. This problem will need to be resolved on a relatively frequent basis. Fortunately, the solution technique is fast (and incremental in nature). It can handle heterogeneous servers, important because some old, slower servers will inevitably be replaced by new, faster servers over time. The Goal procedure is an integral part of the Dynamic procedure and the Static procedure components below.

The Static procedure creates a good, hopefully nearly optimal, assignment of sites to servers, respecting the requirements for public and private requests. And the better this is done, the better the average response time in the Goal procedure can be. The Static procedure component calls the Goal procedure iteratively as it proceeds. The technique can be run either in initial or incremental mode. The initial mode is appropriate when configuring a new web farm. The incremental mode allows for constraints which limit the number of assignment changes, and is thus practical for maintaining high quality website-to-server assignments. A neighborhood escape heuristic is employed, such as that disclosed in R. Garfinkel et al., *Integer Programming*, John Wiley and Sons, New York, N.Y. (1972), the disclosures of which are incorporated by reference herein in their entirety. The incremental mode is meant to be run periodically, perhaps once per week or so. Reconfiguring website-to-server assignments is obviously not a trivial task. The exact frequency will depend on the volatility of the website demand forecasts and the cost of doing the new assignments.

The Dynamic procedure performs the real-time web server routing in the network dispatcher, based on the output of the Static procedure component and on fluctuating website customer demands. It solves a restricted subproblem based on the Goal procedure to compute this idealized routing. It does not transfer the assignment of previously dispatched requests, which could improve performance further but would incur prohibitively high overhead.

Referring to FIG. 1, there is shown an example of a hypothetical web farm 10 having three sites 12 and nine servers 13. A network dispatcher 14 routes customer requests for the three sites 12 to the appropriate servers. The first website 12*a* comprises two servers (1 and 2) and overlaps with the second website 12*b*, which has five servers (2 through 5), and which in turn overlaps with the third website 12*c* having four servers (5 through 9). The results of customer requests are piped back to the customers, who may then make additional requests.

Given the illustrative example of FIG. 1, it will now be useful to describe in detail the three major components of the invention.

The Goal Procedure (Goal) Component

It will be useful to first define some notation. Let M denote the number of websites, which for convenience will always be indexed by i. Let N denote the number of servers, indexed by j. Let the $\{0,1\}$ M×N matrix $A=(a_{i,j})$ signify the potential for assignment of public requests for website i to server j. In other words, $a_{i,j}=1$ if sharable requests for website i can be handled by server j, and $a_{i,j}=0$ otherwise. Analogously, let the $\{0,1\}$ M×N matrix $B=(b_{i,j})$ signify the potential for assignment of private requests for website i to server j. In other words, $b_{i,j}=1$ if non-sharable requests for website i can be handled by server j, and $b_{i,j}=0$ otherwise.

We will assume in practice that a server j handling private requests for website i can also handle public requests for that website. Thus, $a_{i,j}=1$ if $b_{i,j}=1$.

Associated with each server j is a function $R_j$ measuring expected response time as a function of customer arrival rate. This function will depend on the service time distribution, which in turn will depend on the speed of the processor. The function $R_j$ will generally be increasing and convex. Classic queuing techniques exist for calculating or estimating $R_j$ under certain simplifying assumptions about the arrival rate pattern and service time distribution, as taught by Lavenberg, *Computer Performance Modeling Handbook*, Academic Press, New York, N.Y. (1983), the disclosures of which are incorporated by reference herein in their entirety, but in general the function may need to be evaluated via simulation experiments or monitoring. Based on this function we can assume that there will be a maximum acceptable load $L_j$ on server j, in the sense that exceeding this threshold will cause the value of $R_j$ to be too large. If we set $L_j=\infty$ this maximum load constraint will, of course, be lax. Assume at a given moment that there are $c_i$ public requests and $d_i$ private requests in progress for website i. We break these down further into $c_{i,j}$ public requests and $d_{i,j}$ private requests for website i on server j. Thus $$c_i = \sum_{j=1}^{N} c_{ij},$$

and $c_{i,j}=0$ whenever $a_{i,j}=0$ (one cannot handle a public request for a website from a server to which it is not assigned). Similarly, $d_{i,j}=0$ whenever $b_{i,j}=0$. We let $$C = \sum_{i=1}^{M} c_i$$

denote the total number of public requests in progress, and similarly $$D = \sum_{i=1}^{M} d_i$$

denote the total number of private requests in progress.

The server loads can be regarded as optimally balanced given the current load and website-to-server assignments when the objective function $$\sum_{j=1}^{N} R_j \left( \sum_{i=1}^{M} (x_{i,j} + y_{i,j}) \right) \quad (1)$$

is minimized subject to the constraints $$\sum (x_{i,j} + y_{i,j}) \in \{0, \ldots, L_j\}, \quad (2)$$

$$\sum_{j=1}^{N} x_{i,j} = c_i, \quad (3)$$

$$x_{ij} = 0 \text{ if } a_{i,j} = 0, \quad (4)$$

$$\sum_{j=1}^{N} y_{i,j} = d_i, \quad (5)$$

and $$y_{ij} = 0 \text{ if } b_{ij} = 0. \quad (6)$$

Here, $x_{i,j}$ is a decision variable representing the hypothetical number of public requests for website i that might be handled by server j. Similarly, $y_{i,j}$ is a decision variable representing the hypothetical number of private requests for website i that might be handled by server j. The objective function measures the sum of the expected response times at the various servers, which differs by a multiplicative constant from the average response time. This constant is irrelevant from the perspective of the optimization problem. Constraint (2) limits the acceptable load on server i. Constraint (3) ensures that the total number of website i public requests equals the actual number of such requests in progress. Constraint (4) ensures that the website-to-server assignments are respected for public requests. Constraints (5) through (6) are the corresponding requirements for private requests. If $$X_j = \sum_{i=1}^{M} x_{ij}$$

and $$Y_j = \sum_{i=1}^{M} y_{i,j}$$

in the optimal solution, note that $X_j+Y_j$ represents the desired load on server j. Our ultimate goal will be to ensure that the optimal load $X_j+Y_j$ and the actual load $$\sum_{i=1}^{M} (c_{i,j} + d_{i,j})$$

are always close to each other for each server j.

The optimization problem described above is a special case of the so-called discrete class constrained separable convex resource allocation problem. The classes correspond to the public and private requests for the various sites. The problem is discrete because of the constraint (2), a resource allocation problem because of constraints (3) and (5), and class constrained because of constraints (4) and (6). The separability term refers to the nature of the objective function, and the convexity term is obvious. As taught by Tantawi et al., discrete class constrained resource allocation problems can be solved exactly and efficiently using a graph-theoretic optimization procedure.

Figure 2:
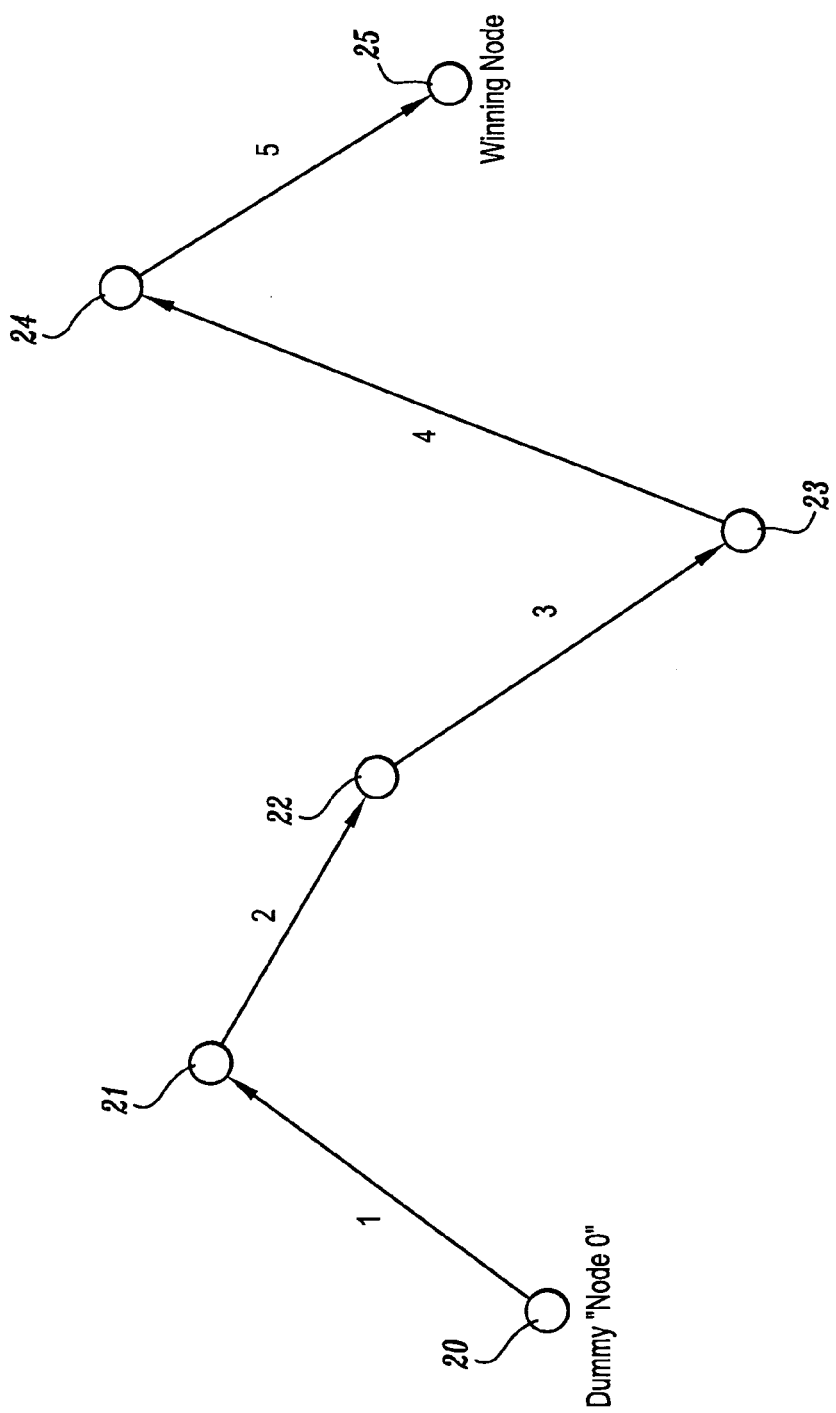
FIG. 2 shows a path from the dummy node to the winning node, part of the Goal procedure.

Referring to FIG. 3, there is shown a flow chart of a preferred embodiment of the Goal procedure. Assuming a feasible solution exists, the procedure proceeds in C+D steps. A directed graph, such as in FIG. 2, is created and will be maintained throughout the course of the procedure. The nodes of the graph are the servers $1, \ldots, N$, plus a dummy node that we label as "node 0". Set $a_{i,0}=1$ and $b_{i,0}=1$ for each i, and $L_0=0$. We will create and modify a partial feasible solution $\{x_{i,j}|i=1, \ldots M, j=0, \ldots, N\} \cup \{y_{i,j}|i=1, \ldots, M, j=0, \ldots, N\}$. Initially, at steps 100 and 105 in FIG. 3, this partial feasible solution is set for each i to have $x_{i,0}=c_i$, $y_{i,0}=d_i$, and $x_{i,j}=y_{i,j}=0$ for all $j=1, \ldots, N$, thus, all resources reside at the dummy node. The directed graph is initialized at step 110 and, at any step, has a directed arc from a node $j_1 \epsilon \{0, \ldots, N\}$ to a node $j_2 \epsilon \{0, \ldots, N\}$ if there is at least one website i, satisfying $$a_{i_1,j_1} = a_{i_1,j_2} = 1, \quad (7)$$

$$x_{i_1,j_1} > 0, \quad (8)$$

$$\sum_{i=1}^{M} (x_{i,j} + y_{i,j}) < L_{j_2}, \quad (9)$$

or, alternatively, at least one website $i_1$ satisfying $$b_{i_1,j_1} = b_{i_1,j_2} = 1, \quad (10)$$

$$y_{i_1,j_1} > 0 \quad (11)$$

and condition (9). Condition (7) indicates that nodes $j_1$ and $j_2$ can handle public requests for website $i_1$. Condition (8) indicates that a public request for website $i_1$ has been allocated to node $j_1$. Condition (9) indicates that this request could be transferred to node $j_2$ without exceeding the load limit on that node. Conditions (10), (11) and (9) are the corresponding requirements for private requests. Note that there may be directed arcs from node 0, but there are no directed arcs to node 0. So the receiving node will always be a real server, not the dummy node.

The general step of the method finds, among all nodes j $\epsilon\{1, \ldots, N\}$ for which there is a directed path from 0 to j, the winning node for which the first difference $$R_j\left(\sum_{i=1}^{M}(x_{i,j}+y_{i,j}+1)\right) - R_j\left(\sum_{i=1}^{M}(x_{i,j}+y_{i,j})\right) \quad (12)$$

is minimal. This so-called first difference is the discrete analog of the derivative for continuous functions. The first differences are non-decreasing in j for each i by virtue of the convexity of $R_j$. If no such node exists, the procedure terminates with an infeasible solution. Otherwise, a shortest directed path is chosen from 0 to the winning node. For each directed arc $(j_1,j_2)$ in this path, the value of $x_{i_1,j_1}+y_{i_1,j_1}$ is decremented by 1 and the value of $x_{i_1,j_2}+y_{i_2}$ is incremented by 1 for an appropriate website $i_1$ (by virtue of either a decrease and increase for a public request or a decrease and increase for a private request). Performing this step over all directed arcs has the effect of removing one unit of load from the dummy node, and adding one unit of load to the winning node. There is no net effect on the load of the intermediate nodes. Thus, the dummy node serves as a staging area for the resources, one of which is released in each step into the server nodes. Bookkeeping is then performed on the directed graph, which may modify some directed arcs and potentially disconnect certain nodes, and the step is repeated. After (C+D) steps the procedure terminates with an optimal solution to the original discrete class constrained resource allocation problem. Feasibility is guaranteed because of the conditions on the arcs in the directed graph.

Referring more specifically to FIG. 3, a preferred embodiment of the Goal procedure begins in step 100 by setting the variables $x_{i,j}$ and $y_{i,j}$ to be 0 for all sites i and servers j. The procedure will increment and decrement these variables as it proceeds. In step 105 a dummy node is initialized as node 0. All resources are initially put there, so that we set $x_{i,0}=c_i$ and $y_{i,0}=d_i$. In step 110 the directed graph connecting the N+1 nodes is initialized according to equations (7)-(11) as is described in more detail with respect to FIG. 3b below. One can determine from this that there will be directed arcs from the dummy node 0 to nodes j such that there is at least one website i with $a_{i,j}=1$ or $b_{i,j}=1$. This graph will be modified as the procedure proceeds. In step 115 we set k=1. This variable will count the units of resource as they are assigned. In step 120 we initialize m to be infinity and j to be 1. In step 125 we determine if there is a directed path from 0 to node j. If there is, in step 130 we evaluate equation (12) for this server j and compare it to m. If it is less, we set j*=j and m to be the value of equation (12) in step 135. This is the currently smallest value of m. Then we proceed to step 140. We also proceed to step 140 if there was no path in step 125 or if equation (12) in step 130 evaluates to m or greater. Step 140 increments j. In step 145 we check if j is N or less. If it is, we return to step 125. Otherwise we proceed to step 150, where we compare m with infinity. If m is not less then infinity there was no path from the dummy node to any node, and there is thus no feasible solution to the problem. So the procedure stops in step 155. Otherwise we proceed to step 160 and find the shortest such path. In step 165 we perform bookkeeping on this path, incrementing and decrementing the appropriate values of $x_{i,j}$ and $y_{i,j}$. In so doing one unit of resource will be removed from the dummy node and one unit of resource will be added to the server j* as is described in more detail below with respect to FIG. 3c. Then, in step 170, we perform bookkeeping on the directed graph, again ensuring that equations (7)-(11) are satisfied. Some directed arcs may be added and some removed in this process, which is described in greater detail with respect to FIG. 3d, below. In step 175 we increment k. We test k to see if it is C+D or less in step 180. If not, the procedure has completed in step 185 with final solution $x_{i,j}$ and $y_{i,j}$, otherwise we return to step 120 to continue the procedure.

Referring to FIG. 2, there is illustrated a path in the directed graph of the class constrained resource allocation procedure. Note that not all the nodes and directed arcs of the graph are shown here. Load is being transferred from the dummy "node 0" 20 to the winning (server) node 25, the node connected to node 0 whose first difference is minimal. The directed path shown is intended to be the shortest such one. The directed arcs are numbered 1 through 5. In the figure one new (public or private) request for some website is allocated via directed arc 1, though the first (server) node 21 to which it is allocated does not change its level of activity. In fact, none of the first four server nodes 21 through 24 have different levels of activity. The fifth, winning server node 25 experiences a gain of one unit of activity, at the expense of the dummy node 20.

Figure 3A:
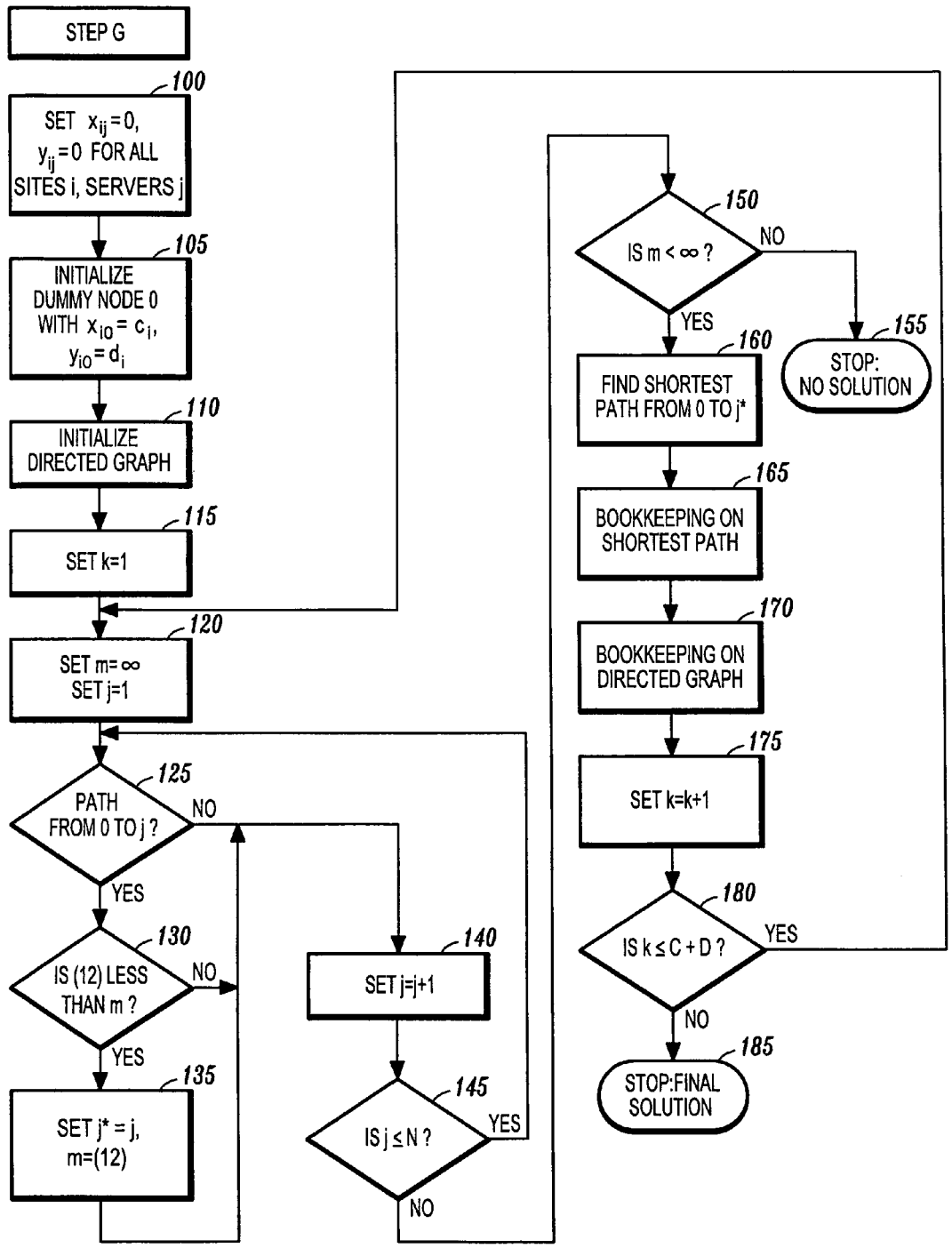
FIG. 3a is a flow chart of the Goal procedure.
Figure 3B:
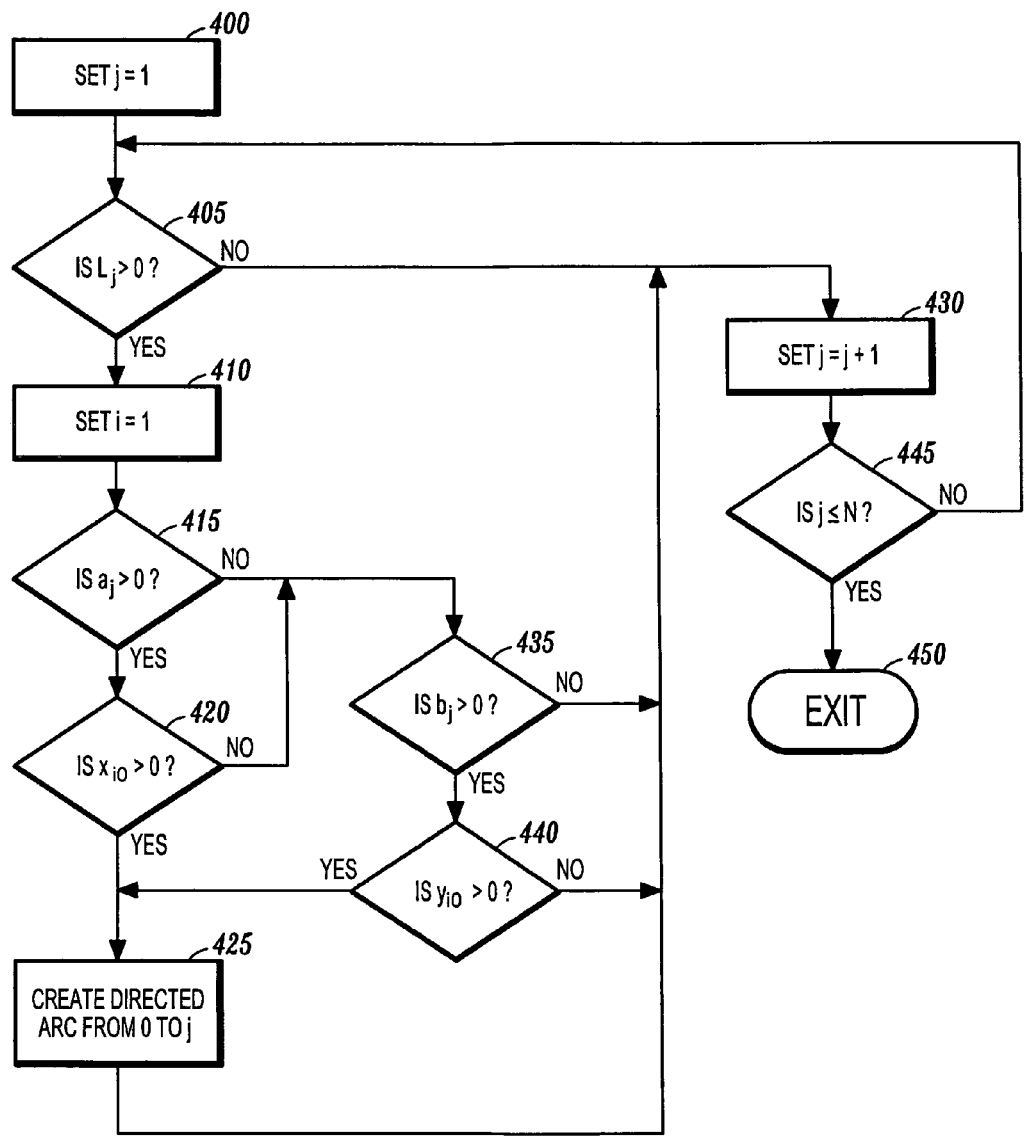
FIG. 3b is a flowchart of an initialization step of the Goal procedure.

Referring to FIG. 3b, there is shown a flowchart of the initialization procedure corresponding to step 110 from FIG. 3. In step 400 we initialize j=1 and then test to see if $L_j$ is greater than 0 in step 405. If so, we initialize i to be 1 in step 410 and test to see if $a_j$ is greater than 0 in step 415. If so, we test to see if $x_{i0}$ is greater than 0 in step 420. If so, we create a directed arc from the dummy node 0 to j in step 425 and proceed to step 430. If either step 415 or step 420 fail, then we proceed to step 435, where we test to see if $b_j$ is greater than 0. If it is, we then test to see if $y_{i0}$ is greater than 0 in step 440. If it is, flow proceeds to step 425, as before. If either step 435 or step 440 fails, control flows to step 430, wherein j is incremented. In step 445 we test to see if j is less than or equal to N. If not, control loops back to step 405, otherwise we exit at step 450.

Figure 3C:
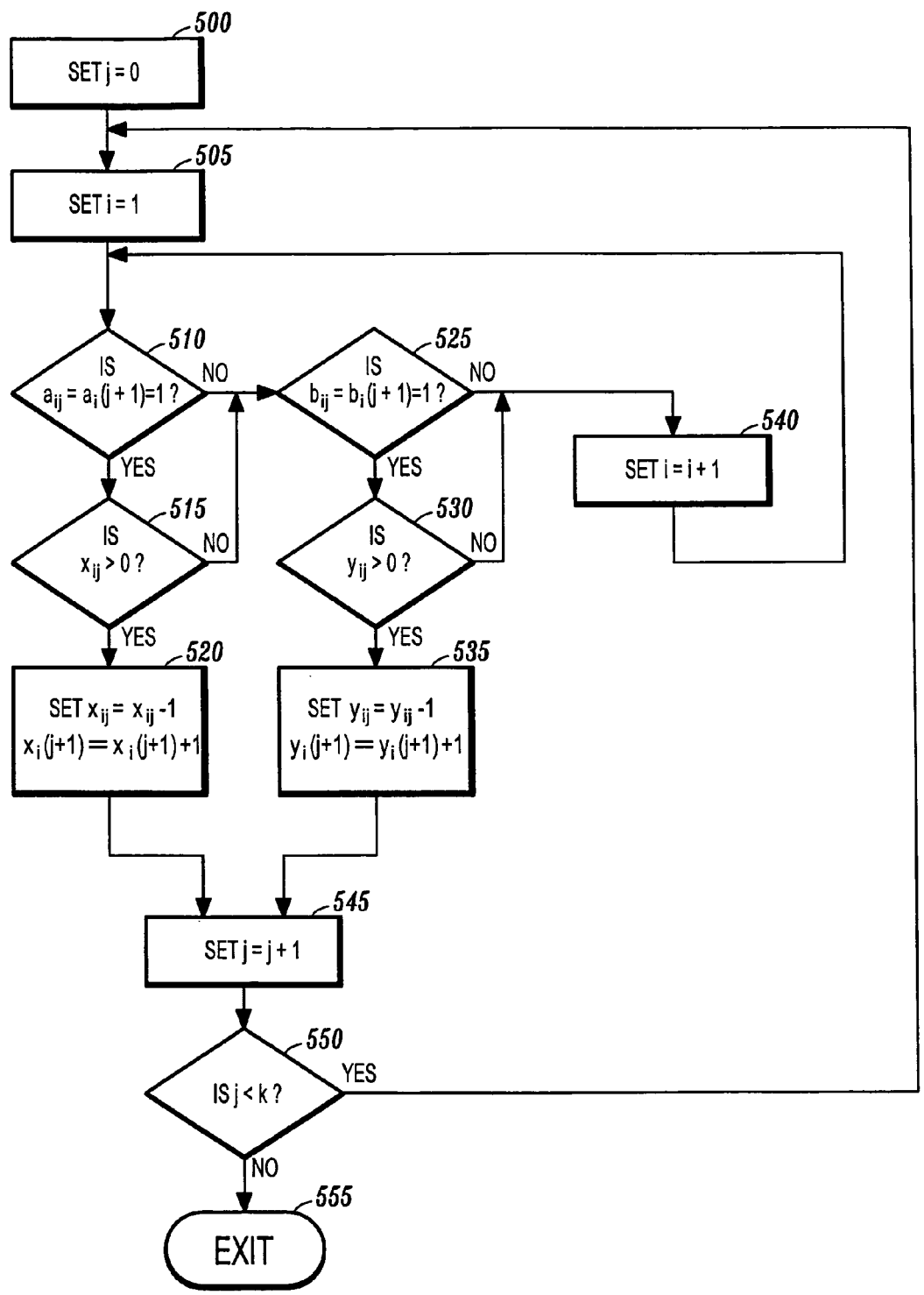
FIG. 3c is a flowchart of a path bookkeeping step of the Goal procedure.

Referring to FIG. 3c, there is shown a flowchart of the path bookkeeping procedure of Step 165 of FIG. 3. In this flowchart we assume that the shortest path has k directed arcs and is labeled from $j_0=0$ to $j_1$ to $j_2$, and so on to $j_k=j$. In step 500 we initialize j=0, and in step 505 we initialize i=1. In step 510 we check to see if $a_{ij}=a_i(j+1)=1$. If it is, we check if $x_{ij}$ is greater then 0 in step 515. If it is, we decrement $x_{ij}$ and increment $x_i(j+1)$ in step 520. If either test in steps 510 or 515 fail we proceed to step 525, where we check analogously to see if $b_{ij}=b_{i(j+1)}=1$. If it is, we check if $y_{ij}$ is greater than 0 in step 530. If so, we decrement $y_{ij}$ and increment $y_i(j+1)$ in step 535. If either test in steps 525 or 530 fail we proceed to step 540, where we increment i and return to step 510 (we know that one server i will eventually pass this test by the constraints). Now after step 520 or step 535 we proceed to step 545 where we increment j. We test to see if j is less than k in step 550. If so we return to step 505. If not, the procedure exits at step 555.

Figure 3D:
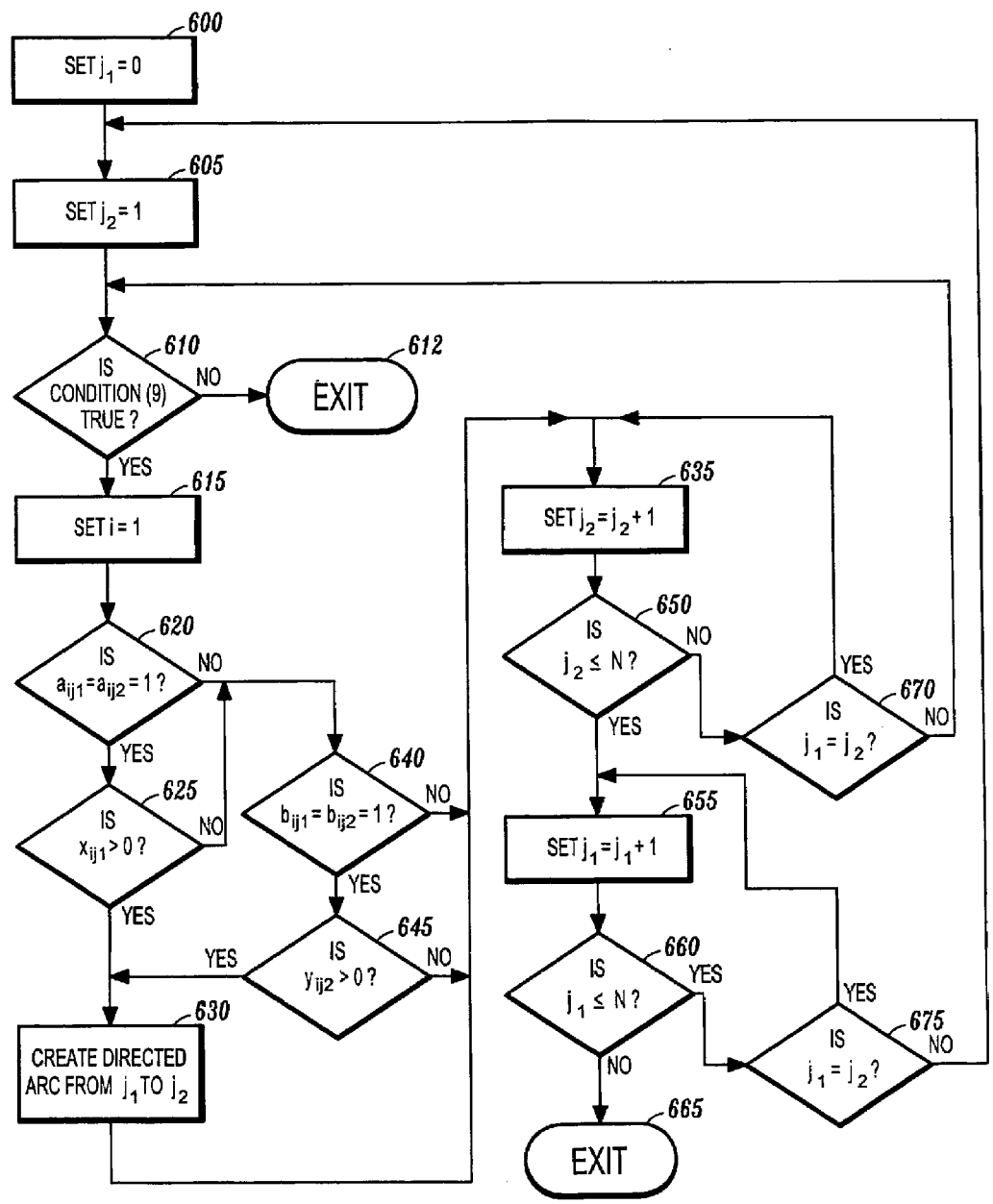
FIG. 3d is a flowchart of a graph bookkeeping step of the Goal procedure.

Referring to FIG. 3d, there is shown a flowchart of the graph bookkeeping procedure of Step 170 of FIG. 3. Beginning at step 600, we initializes $j_1$ to be 1. In step 605 we initialize $j_2$ to be 1. We test to see if condition (9) regarding $L_{j2}$ is true in step 610. If not, the procedure exits at 612, otherwise we initialize i=1 in step 615 and then test to see if $a_{j1}=a_{j2}=1$ in step 620. If it is, we test to see if $x_{ij1}$ is greater than 0 in step 625. If it is, we create a directed arc from node $j_1$ to node $j_2$ in step 630 and proceed to step 635, where $j_2$ is incremented. If either step 620 or step 625 fail, we proceed to step 640, where we test to see if $b_{j1}=b_{j2}=1$. If it is, we test to see if $Y_{ij2}$ is greater than 0 in step 645. If it is, we proceed to step 630, as before. If either step 640 or step 645 fail, we proceed to step 635. In step 650 we test to see if $j_2$ is less than or equal to N. If it is, we increments $j_1$ in step 655 and proceed to step 660, where we test to see if $j_1$ is less than or equal to N. If not, we exit at step 665. If the test in step 650 fails, we proceed to step 670, checking if $j_1=j_2$. If $j_1=j_2$, we return to step 635; otherwise we return to step 610. If the test in step 660 fails, we proceed to step 675, where we also check if $j_1=j_2$. If $j_1=j_2$, we return to step 655; otherwise we return to step 605.

The Dynamic Procedure (Dynamic)

Figure 4:
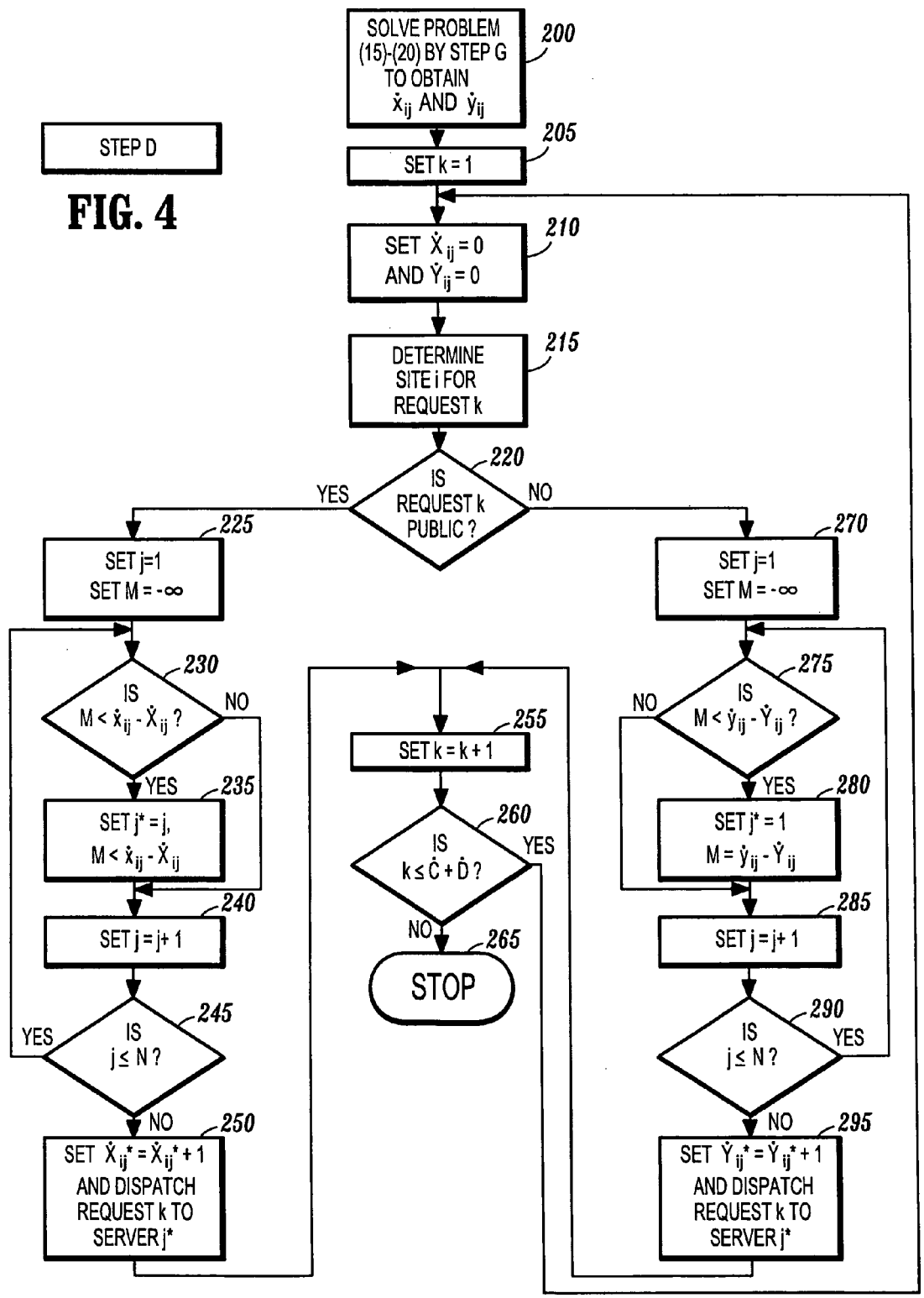
FIG. 4 is a flow chart of the Dynamic procedure.

Referring to FIG. 4, we now describe the Dynamic procedure component of the load balancing procedure. The technique assumes (the Static procedure component) assignments of sites to servers as a given. This amounts to the determination of the matrices A and B. It then monitors exact or approximate loads at the servers, as well as the arrival of new customer requests at the network dispatcher. The job of the Dynamic procedure component is to make routing decisions in the network dispatcher for these queued requests, assigning them to appropriate servers. In doing so, it tries to achieve to the extent possible the optimal average response time and server load levels dictated by the Goal procedure. Indeed, it calls the Goal procedure on the traffic queued in the network dispatcher to make its decisions. The routing decisions could be implemented via an exact or a probabilistic policy. Once the requests are assigned by the Static procedure component to servers, they will be satisfied at those servers. In other words, in the preferred embodiment, the decision of the network dispatcher is regarded as final, and requests at the servers themselves cannot be redirected based on load.

It will be useful to define some meta notation. At any given time, some load will be queued in the network dispatcher and some will have already been dispatched to the servers. We wish to differentiate these two types of load, as well as the overall load. We will use a single dot when referring to variables that pertain to load in the dispatcher, and a double dot when referring to variables that pertain to load in the servers. If no dots are employed the variables will refer to the combined dispatcher and server load.

The method monitors the current number of dispatched public requests $\ddot{c}_{i,j}$ and the number of dispatched private requests $\ddot{d}_{i,j}$ for website i on server j. The Dynamic procedure component does not react directly to completions of requests on the servers, but it does decrement the values of $\ddot{c}_{i,j}$ and $\ddot{d}_{i,j}$ appropriately. If this data is not readily available it may be estimated. In the meantime, new requests arrive and queue up in the network dispatcher. Let $\dot{c}_i$ denote the number of new public requests for website i since the last execution of the Dynamic procedure component. Similarly, let $\dot{d}_i$ denote the number of new private requests for website i since the last execution of the Dynamic procedure component. Aggregating, we let $$\dot{C} = \sum_{i=1}^{M} \dot{c}_i$$

and $$\dot{D} = \sum_{i=1}^{M} \dot{d}_i$$

denote the total number of queued public and private requests, respectively, in the dispatcher.

The Dynamic procedure component may be designed to wake up and execute after a fixed time interval, after the number of items $\dot{C}+\dot{D}$ in the queue reaches some fixed batch size threshold, or perhaps some combination of both criteria.

We apply the Goal procedure to the requests queued in the network dispatcher, while leaving the previously dispatched requests alone. To do this we shall require a little bookkeeping. Specifically, we define for each server j a new convex increasing function $\dot{R}_j(z)$ by setting $$\dot{R}_j(z) = R_j(z + \Sigma(\ddot{c}_{i,j} + \ddot{d}_{i,j})) \quad (13)$$

This function simply shifts the original function to account for the amount of unperturbable load in the server. For the same reason we also define for each server j a revised acceptable load limit $\dot{L}_j$ by setting $$\dot{L}_j = L_j - \sum_{i=1}^{M}(\dot{c}_{i,j} + \dot{d}_{i,j}) \qquad (14)$$

With these formalities, the optimal way to dispatch the $\dot{C}+\dot{D}$ queued requests is determined by solving the following restricted the Goal procedure component problem:

Minimize subject to the constraints:

$$\sum_{j=1}^{N} R_j\left(\sum_{i=1}^{M}(\dot{x}_{i,j} + \dot{y}_{i,j})\right) \qquad (15)$$

$$\sum_{i=1}^{M}(\dot{x}_{i,j} + \dot{y}_{i,j}) \in \{0, \ldots, \dot{L}_j\}, \qquad (16)$$

$$\sum_{j=1}^{N} \dot{x}_{i,j} = \dot{c}_i, \qquad (17)$$

$$\dot{x}_{i,j} = 0 \text{ if } a_{i,j} = 0, \qquad (18)$$

$$\sum_{j=1}^{N} \dot{y}_{i,j} = \dot{d}_i \qquad (19)$$

and $$\dot{y}_{i,j} = 0 \text{ if } b_{i,j} = 0, \qquad (20)$$

which corresponds to step 200 of FIG. 4. Even in the optimal solution the total load $$\sum_{i=1}^{M}(\dot{x}_{i,j} + \dot{y}_{i,j} + \dot{c}_{i,j} + \dot{d}_{i,j})$$

on server j is suboptimal overall. It is, however, optimal subject to the additional constraint that no previously assigned load can be transferred amongst servers.

Furthermore, note that in the special case where the technique wakes up whenever a new request arrives to the network dispatcher, so that either $\dot{c}_{i_1,j}=1$ or $\dot{d}_{i_1,j}=1$ for some website $i_1$, the procedure is simply greedy. In other words, if $\dot{c}_{i_1,j}=1$, so that a new public request for website $i_1$ is to be assigned, that server j satisfying $a_{i_1,j}=1$ and $$\sum_{i=1}^{M}(\dot{c}_{i,j} + \dot{d}_{i,j}) < L_j$$

whose first difference $$R_j\left(\sum_{i=1}^{M}\dot{c}_{i,j} + \dot{d}_{i,j} + 1\right) - R_j\left(\sum_{i=1}^{M}\dot{c}_{i,j} + \dot{d}_{i,j}\right) \qquad (21)$$

is minimal is chosen. If $\dot{d}_{i_1,j}=1$, so that a new private request for website $i_1$ is to be added, that server j satisfying $b_{i_1,j}=1$ and the load limit constraint whose first difference given by expression (21) is minimal is chosen.

Figure 6:
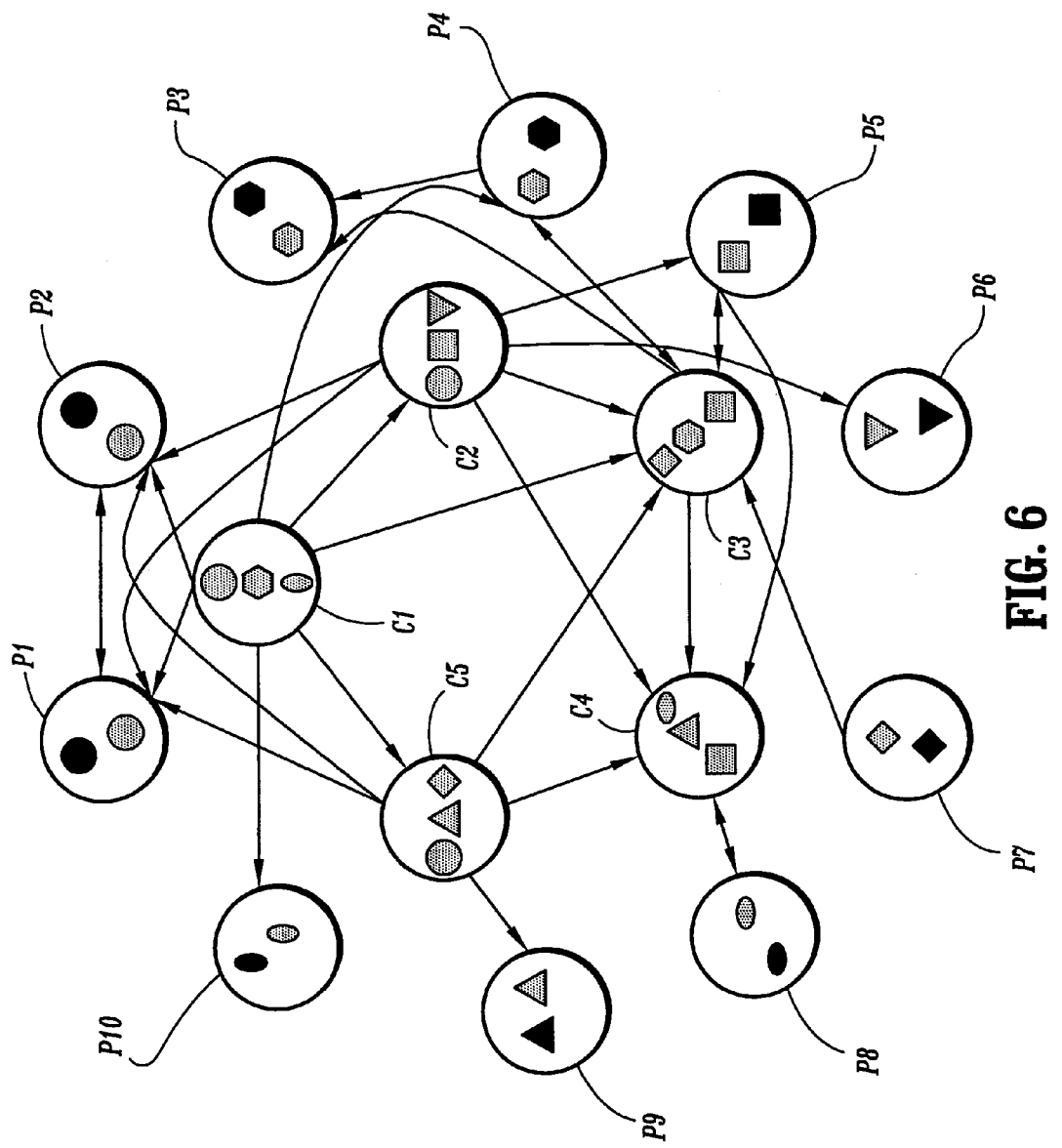
FIG. 6 shows the directed graph of the Dynamic procedure in the same example.

The Dynamic procedure may be illustrated by the example shown in FIGS. 5 and 6. We consider a 15 server configuration hosting 8 sites. There are 5 servers assigned to handle public website traffic. We will call these cluster servers, because each such server has the capability of handling traffic from multiple sites. There are also 10 servers assigned to handle private website traffic. We will therefore call these partition servers. Each such server can handle both public and private traffic, but only from a single website. Consider FIG. 5, which is a website symbol glossary for this example. Each symbol has a shape unique to the website. For example, circularlogic.com is represented by a circle. The gray symbols indicate public traffic and the black symbols indicate private traffic. The relevant cluster and partition server cardinalities are also indicated. These are the row sums $$\sum_{j=1}^{N} A_{i,j}$$

and $$\sum_{j=1}^{N} B_{i,j}$$

of the assignment matrices A and B, respectively. For example, circularlogic.com is assigned 3 cluster servers and 2 partition servers.

All this is seen in more detail in FIG. 6. The inner loop contains the 5 cluster servers, C1 through C5, and the outer loop contains the 10 partition servers, P1 through P10. Note, for instance, that circularlogic.com is assigned to cluster servers C1, C2, and C5. On server C1 the public traffic for this website must share the server with the public traffic for hexnut.com and eggcenitric.com. Similarly, circularlogic.com is assigned to partition servers P1 and P2. Each of these two servers handle both public and private traffic, but only for this website.

Actually, FIG. 6 conveys more information. It shows a slightly modified directed graph of the sort used by the Goal procedure. Recall FIG. 2, which illustrated a shortest path from the dummy node to a server node at a particular instant of time in the solution of the class constrained resource allocation problem. By contrast, FIG. 6 shows a directed graph H showing, with one exception, all the directed arcs and nodes at such an instant. (The exception is that the dummy node and the directed arcs coming from it have been eliminated.)

So H is defined as follows: the nodes correspond to the servers. For each pair $j_1$ and $j_2$ of distinct server nodes, there is a directed arc from $j_1$ to $j_2$ provided there exists at least one website $i_1$ satisfying conditions (7) through (9) or conditions (10), (11), and (9).

In FIG. 6 not all directed arcs appear in both directions, because they may fail to meet all the relevant constraints. For example, there is no directed arc from P3 to P4, apparently because there is no load on P3, either public (condition 8) or private (condition 11). There is no directed arc from C3 to P7, apparently because P7 is operating at full capacity (condition 9). There is no arc in either direction between C1 and P3, apparently because there is no public load on P3 (condition 8) and because C1 is operating at full capacity. There is no arc in either direction between P1 and C4, because neither condition (7) nor condition (10) is satisfied.

Again, the existence of a directed arc signifies the potential for reducing the load on the server, increasing the load on another without exceeding the load capacity, and leaving the loads on other servers unaffected. A directed path from the dummy node to one of the server nodes allows the transfer one unit of load from the staging node to that server node, leaving all other server nodes unaffected. After this transfer, the graph H may be modified via a bookkeeping technique to respect the current status of constraints (8), (9) and (11). (The status of constraints (7) and (10) remain intact.)

One can see in FIG. 6 three different types of directed arcs. One type, indicating potential 4 transfers of either public or private load from one partition server to another, can be seen between P1 and P2. A second type, indicating potential transfers between public load from a partition server to an cluster server or vice versa, can be seen between P1 and C1. A third type, indicating potential transfers between public load from one cluster server to another, can be seen between C1 and C2.

It should be understood that the tighter the graph H is, in terms of having as many directed arcs as possible, the more likely it is that the Goal procedure can achieve good quality results that yield lower response times. This is the goal of the Static procedure component described next.

A detailed embodiment of the Dynamic procedure is shown in the flowchart of FIG. 4. Control flow begins at step 200, employing the Goal procedure to solve for the optimal goals $\dot{x}_{i,j}$ and $\dot{y}_{i,j}$ for each website i and server j. In step 205 we set k=1. In step 210 we initialize $\dot{X}_{i,j}$ and $\dot{Y}_{i,j}$ for each website i and server j to be 0. These variables will count the progress of the dispatcher relative to the goals. In step 215 we determine what website corresponds to request k in the queue. Step 220 determines whether the request is public or private. There are comparable flows for each of these two possibilities, and we focus on the public alternative. This begins with step 225, where we set j=1 and M to be negative infinity. We will try to find the server with the maximum difference between the goals and the achieved values, as follows: In step 230 we ask if M is less than $\dot{x}_{i,j} - \dot{X}_{i,j}$. If it is, we set j*=j and M=$\dot{x}_{i,j} - \dot{X}_{i,j}$ in step 235, and proceed to step 240. We also branch to step 240 if the test in step 230 fails. In step 240 we increment j. In step 245 we ask whether j is less than or equal to N. If it is, we return to step 230. If not, we have a winning server j* and we increment $\dot{X}_{i,j}*$ and dispatch request k to server j* in step 250. We then proceed to step 255, where k is incremented. In step 260 we test if k is less than or equal to $\dot{C}+\dot{D}$. If it is, we return to step 210 to dispatch the next request. If not, we stop, having emptied the queue of requests. If step 220 determines that request is a private request we proceed to steps 270 through 295. These steps are precisely analogous to steps 225 through 250 except that they deal with private rather than public requests. Ultimately, control flow returns to step 220 again.

The Static Procedure Component

Figure 7:
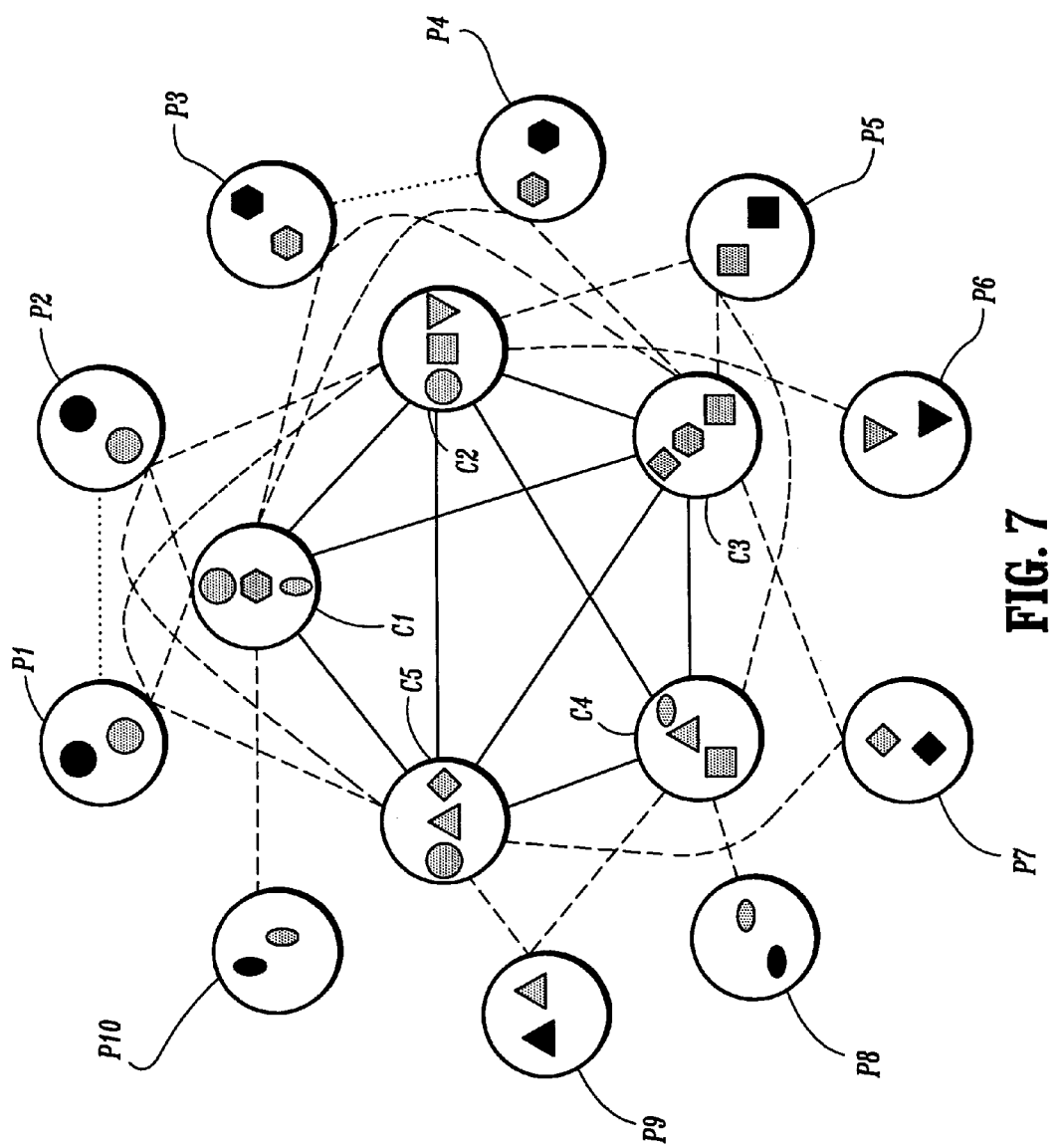
FIG. 7 shows the undirected graph of the Static procedure in the same example.
Figure 8:
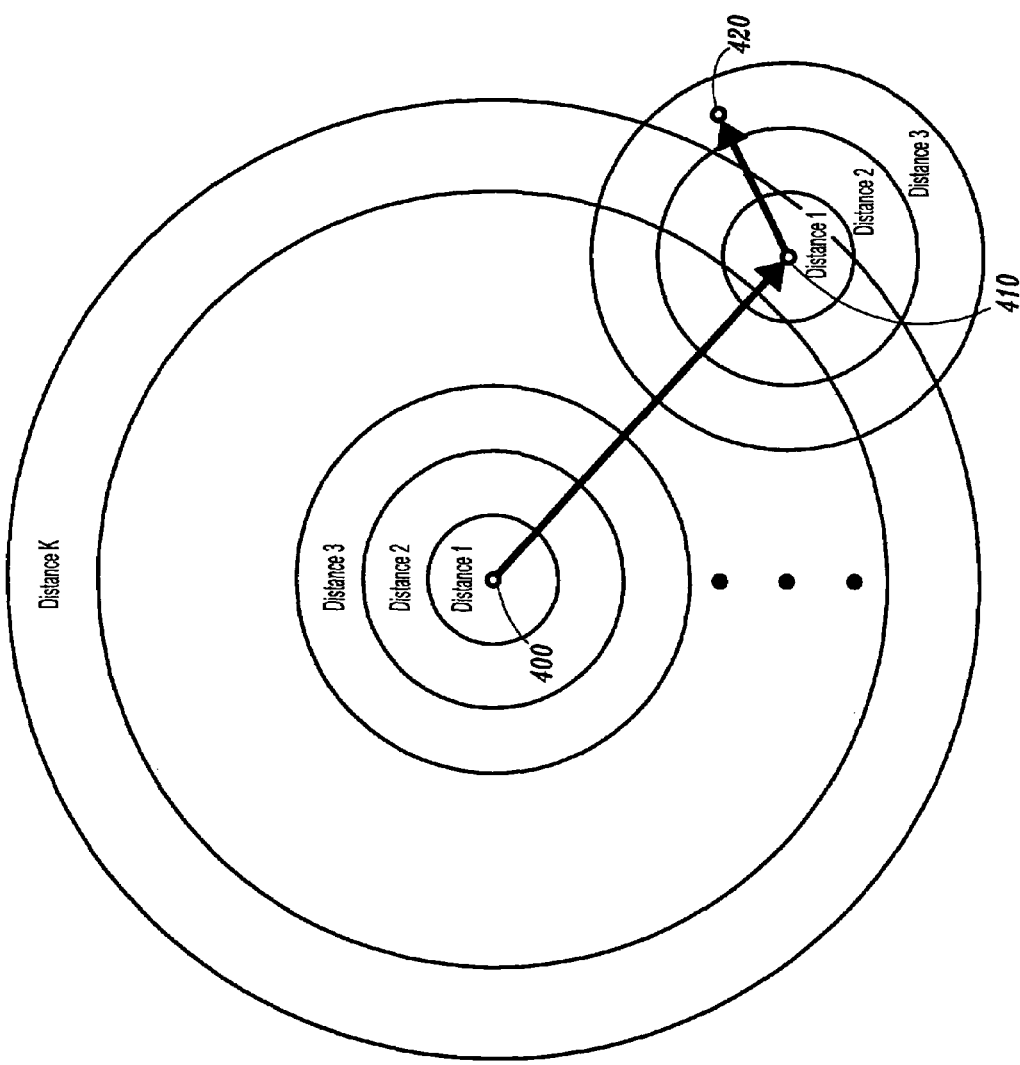
FIG. 8 shows the neighborhood escape heuristic in the Static procedure.
Figure 9:
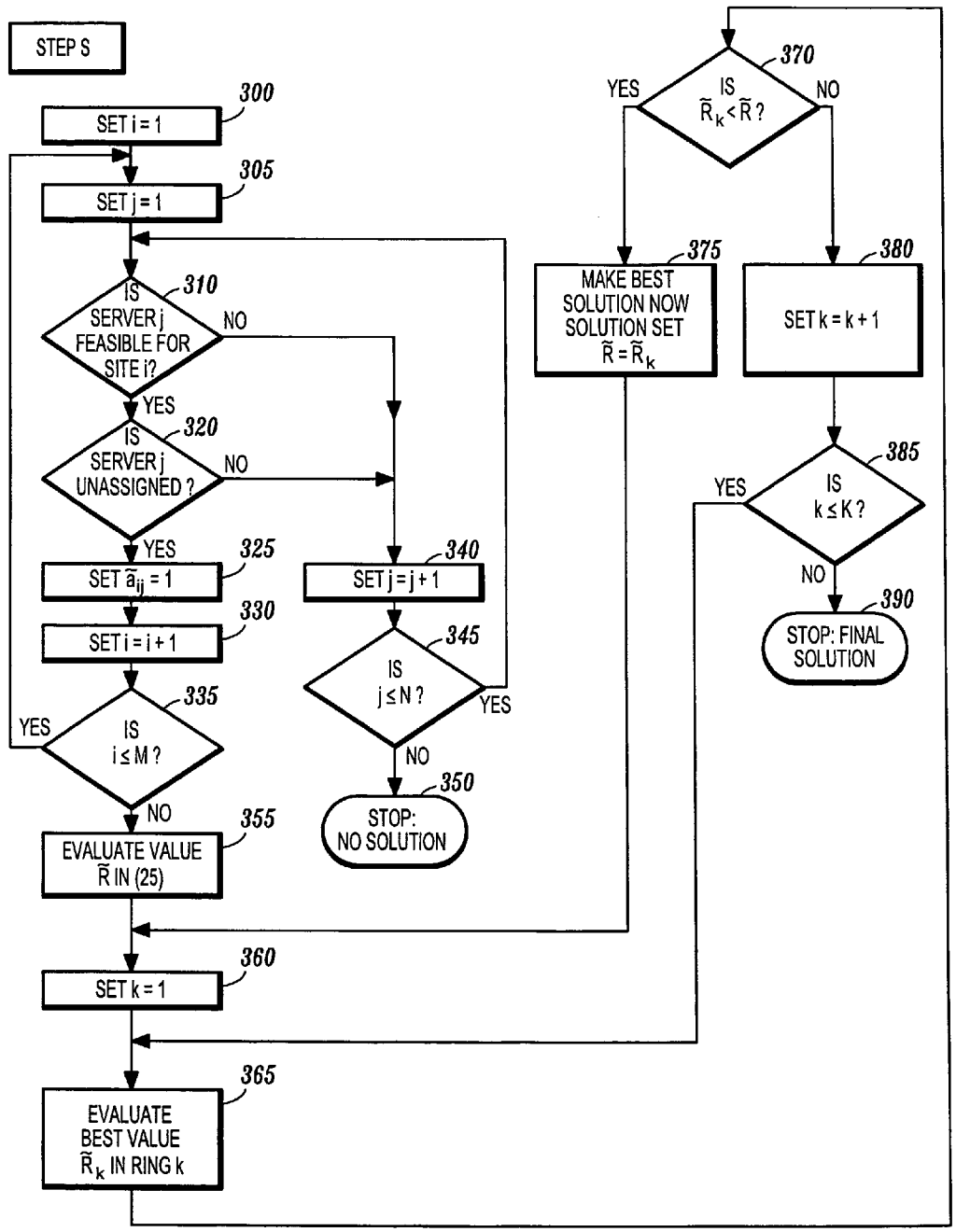
FIG. 9 shows a flow chart of the Static procedure.

Referring to FIGS. 7 through 9, we now describe the Static procedure component, which assigns sites to servers. The goal is to optimize the achievable performance of the Goal procedure and therefore of the Dynamic procedure component. The key input to the Static procedure component will be forecasts of the average demand for public and private requests for each website, as well as any constraints on the allowable website-to-server assignments. The output of the Static procedure component will be simply the two {0,1} assignment matrices $A=(a_{i,j})$ and $B=(b_{i,j})$.

We also assume the constraints on website-to-server assignments as given. These constraints might pertain to the physical capacities of the servers themselves, to the goal of achieving acceptably high cache hit rates, to the operating systems on the servers, to fixed server assignments certain sites might have negotiated, and so on. Such constraints might be quite complicated or quite elementary. For example, a cache constraint might be relatively complex, based perhaps on an analytic hit rate model, the locality of the website data and the cache size. It would have the effect of ensuring that a relatively small number of sites be assigned to each server. On the other hand, an operating system constraint might simply be a list of which sites are inappropriate for certain servers. The point is that the Static procedure component is heuristic in nature and can deal with the constraints simply by checking them before considering any changes in assignments.

The Static procedure component has two possible modes. The initial mode (FIG. 9) is used to configure a new system from scratch, one for which no sites have yet been assigned to servers. The incremental mode is then used on a periodic basis to adjust existing website-to-server assignments based on revised website demand forecasts. In order to ensure that the implementation of those adjustments is practical, we allow for a constraint that limits the allowable number of website-to-server assignment changes allowed. Both modes will be seen to employ essentially the same methodology. In the initial mode one might have to employ analytic models for the response time functions, while in the incremental mode one could use more accurate measured response times instead. These presumably would better capture the effects of caching and other real world phenomena.

The incremental the Static procedure component should not be executed too frequently, because there is an obvious cost in making the assignment changes. Once or so per week is probably reasonable. The exact frequency will depend on the relative tradeoff of this cost compared with the potential for performance improvement given updated website forecasts. Presumably a run of the Static procedure could be triggered by the detection of some sort of load imbalance condition.

The primary goal in both modes is to achieve high connectivity of the undirected graph G defined as follows: The nodes correspond to the servers. For each pair $j_1$ and $j_2$ of distinct nodes, there is an arc between $j_1$ and $j_2$ provided there exists at least one website $i_1$ for which $a_{i_1,j_1}=a_{i_1,j_2}=1$, or at least one website $i_1$ for which $b_{i_1,j_1}=b_{i_1,j_2}=1$. These conditions mimic condition (7) and (10) in the definition for the directed graph H. Because conditions (8), (9), and (11) will generally be satisfied in any well-balanced web farm, the notion is that G serves as an effective surrogate for H. Note also that conditions (7) and (10) are essentially static, while conditions (8), (9) and (11) are inherently dynamic. That is why G is more appropriate for the Static procedure component.

FIG. 7 shows the graph G for the example described above. Note the similarities to the directed graph H shown in FIG. 6. There is, however, an arc in FIG. 7 between servers C1 and P3, even though FIG. 6 has no comparable directed arc in either direction. And several other directed arcs in FIG. 6, such as the one from server P4 to P3, are not matched by directed arcs in the opposite direction. Notice that in FIG. 7, arcs between two cluster servers are shown as solid lines, arcs between two partition servers as dotted lines, and arcs between an cluster and a partition server as dashed lines.

The objective function we will attempt to optimize is that of the Goal procedure component itself, which we treat as a black box in our invention. The rationale here is that this measure, effectively the average response time, is clearly more directly appropriate than either of the other two graph-theoretic surrogates (diameter or average distance), and not significantly more computationally expensive to compute.

The meta notation employed is that a tilde () will refer to the Static procedure problem formulation.

We will proceed by inventing a new matrix $\tilde{A}$ that will describe the space of (in some sense preferred) assignments of sites to servers, as follows: $\tilde{A}=(\tilde{a}_{i,j})$ will again be a $\{0,1\}$ matrix of size M×N. Under the typical conditions that there exist both public and private traffic for each website, we will make the translation from $\tilde{A}$ to $A_{\tilde{A}}$ and $B_{\tilde{A}}$ in the following fashion.

$$a_{i,j}=\tilde{a}_{i,j} \qquad (22)$$

$$b_{i,j} = \begin{cases} 1 & \text{if } \tilde{a}_{i,j} = 1 \text{ and } \tilde{a}_{i',j} = 0 \text{ for all } i' \neq i, \\ 0 & \text{otherwise.} \end{cases} \qquad (23)$$

This makes the implicit assumption that any server j for which the row sum $$\sum_{i=1}^{M} \tilde{a}_{i,j} = 1$$

is a partition server with both public and private traffic for one website, and all other servers, are servers with multiple public website traffic. Notice that not all possible pairs of assignment matrices A and B can be regarded as translated from some matrix $\tilde{A}$. The ones that cannot are, however, less preferable to us. The Static procedure component will not choose them.

We have to make minor adjustments to handle special cases. If only private traffic exists for website i we will require that $\tilde{a}_{i',j}=0$ for i'≠i whenever $\tilde{a}_{i,j}=1$. This makes j a partition server for website i. We set $a_{i,j}=0$ and $b_{i,j}=1$. If only public traffic exists for website i any server j assigned to that website can be regarded officially as public, even if $$\sum_{i=1}^{M} \tilde{a}_{i,j} = 1.$$

So we set $a_{i,j}=\tilde{a}_{i,j}$ and $b_{i,j}=0$.

We will also need to modify the response time function $R_j$ for each server j, in order to handle the cases where the load on that server exceeds its load limit $L_j$. Such infeasibilities may well occur, at least in the early stages of our the Static procedure component procedures, and we need to handle them by forcing feasibility at a large objective function cost. So consider a very large number Q and let $\tilde{R}_j(k)=R_j(k)$ for k $L_j$, but $\tilde{R}_j(L_j+1)=\tilde{R}_j(L_j)+Q$, $\tilde{R}_j(L_j+2)=\tilde{R}_j(L_j+1)+2Q$, and so on. The general recursion defines $$\tilde{R}_j(L_j+k)=\tilde{R}_j(L_j+k-1)+kQ \qquad (24)$$

for k>0. Note that $\tilde{R}_j$ remains convex and increasing. We also redefine the maximum acceptable load to be $\tilde{L}_j=\infty$.

Let $\tilde{c}_i$ and $\tilde{d}_i$ refer to the forecasted public and private load, respectively, for website i. We will base our exposition on the case where both public and private traffic exists for each website, but one can quickly determine the appropriate modifications when this is not the case.

Without loss of generality let us assume that sites have been reindexed in terms of increasing forecasted total load $\tilde{c}_i+\tilde{d}_i$. We will also assume that the servers have been reindexed in terms of increasing performance. This could, for example, be determined by their original maximum acceptable loads $L_j$.

The first step of the initial assignment method is the matching of sites to servers in sequence to the extent possible. There may be feasibility constraints that restrict certain sites from certain servers, and one must respect these. So, looping from website i=1 to M in order as shown in steps 305 through 335 of FIG. 9, we set $\tilde{a}_{i,j1}=1$ at step 325, where j is the lowest index of a feasible but currently unassigned server, and we set $\tilde{a}_{i,j}=0$ for all other j at initialization. It is possible but presumably highly unlikely that there will not be feasible assignments possible for all sites. This might happen because of the constraints, and it might happen because M>N. In this case the initial assignment technique has failed. Otherwise, there are M partition servers at this point, and the remaining N−M servers are idle.

We evaluate the objective function for this initial solution, which happens to be $$\sum_{i=1}^{M} \tilde{R}_{j_i}(\tilde{c}_i + \tilde{d}_i) \qquad (25)$$

The initial solution will now be modified by the implementation of a so-called neighborhood escape heuristic. This heuristic employs a metric Δ to measure distances between two possible assignments of sites to servers, which we shall describe shortly. Briey, a neighborhood escape heuristic is an iterative improvement procedure that attempts to avoid being trapped in local minima while achieving relatively low computational costs. Assuming the predefined metric Δ for the moment on the search space of feasible solutions, plus an existing initial feasible solution such as the one described above, the technique proceeds in stages. At the beginning of each stage there is a so-called current solution that may be modified during the stage. At the beginning of the first stage the current solution is the initial solution. Each stage successively searches the neighborhoods of distance 1, 2 and so on about the current solution. (A neighborhood of distance k about the current solution is the set of all feasible assignments whose distance from the current solution is less than or equal to k. A ring of distance k about the current solution is the set of all feasible assignments whose distance from the current solution is equal to k, which is the neighborhood of distance k minus the neighborhood of distance k−1). If an objective function improvement can be found in the neighborhood of distance 1 about the current solution, the heuristic chooses the best such improvement, relabels it as the current solution, and iterates the process by starting the next stage. If no improvement can be found within the neighborhood of distance 1, the heuristic considers the ring of distance 2 instead. Again there are two possibilities: If there is an improvement here, the best such improvement is chosen as the current solution and the procedure starts the next stage. If not, the procedure considers the ring of distance 3, and so on, up to a fixed distance limit, say K. If no objective function improvements have been reached within the $K^{th}$ ring, the process terminates with a final solution equal to the current solution. The check of the various rings occur in steps 360, 380, and 385 of FIG. 9. Improvement is checked for in Step 370.

FIG. 8 illustrates this process. The current solution at the start of the initial stage is at the center 400 of the first set of neighborhoods, DISTANCE 1. The heuristic searches the first neighborhood and subsequent rings in sequence until an improvement is found. In the figure it is only in the $K^{th}$ ring DISTANCE K that an improvement occurs. Then the heuristic resets the current solution to be the best improvement found in that search as represented by the new center 410, and commences the second stage. The figure shows the neighborhoods about that solution. An improvement is now found in the 3rd ring. The third stage now commences, though we do not show it in the figure. Had the $K^{th}$ ring failed to yield an improvement in the first stage the initial solution would have been the final solution.

We now define the distance metric Δ. Let $$\tilde{A}^1 = (\tilde{a}^1_{i,j})$$

and $$\tilde{A}^2 = (\tilde{a}^2_{i,j})$$

be two such assignments, and define $$\Delta(\tilde{A}^1, \tilde{A}^2) = \sum_{i=1}^{M}\sum_{j=1}^{N} |\tilde{a}^1_{i,j} - \tilde{a}^2_{i,j}| \quad (26)$$

The intent here is simple: If, for example, we modify an assignment $\tilde{A}^1$ into a new assignment $\tilde{A}^2$ by adding or subtracting a single website to one of the servers, we obtain $\Delta(\tilde{A}^1, \tilde{A}^2)=1$. A move of a website from an old server to a new server (which did not have that website assigned previously) has DISTANCE 2 in FIG. 8. Subtracting a website from a server and a simultaneous adding a different website to that server also has DISTANCE 2. A swap of different sites on different servers has DISTANCE 4, and so on.

For a given solution $\tilde{A}$ and its translated assignment matrices $A_{\tilde{A}}$ and $B_{\tilde{A}}$, the test for improvement involves solving the Goal procedure component problem of minimizing $$\sum_{j=1}^{N} \tilde{R}_j \left( \sum_{i=1}^{M} (\tilde{x}_{i,j} + \tilde{y}_{i,j}) \right) \quad (27)$$

$$\sum_{j=1}^{N} \tilde{x}_{i,j} = \tilde{c}_i \quad (28)$$

subject to the constraints $$\tilde{x}_{i,j}=0 \text{ if } a_{i,j}=0 \quad (29)$$

$$\sum_{j=1}^{N} \tilde{y}_{i,j} = \tilde{d}_i \quad (30)$$

and $$\tilde{y}_{i,j}=0 \text{ if } b_{i,j}=0 \quad (31)$$

The constraints involving $\tilde{L}_j=\infty$ are vacuous, of course. But given the cost of load that exceeds the limit $L_j$ one would expect the solution to satisfy $$\sum_{i=1}^{M} (\tilde{x}_{i,j} + \tilde{y}_{i,j}) \in \{0, \ldots, L_j\} \quad (32)$$

for each server j after very few stages in the neighborhood escape heuristic. So assignments that are feasible from all perspectives should be achievable in short order. Indeed, the first few stages of the procedure will typically assign high volume sites to the currently unused servers, and then the technique will start to turn partition servers into cluster servers, typically changing the status of the higher performance servers first.

An incremental procedure will be run periodically, perhaps once per week, to retain good website-to-server assignments in the presence of changing forecasts and such. Fortunately, it uses virtually the same methodology.

The initial solution is the current solution from the last the Static procedure component run, of course, and we modify it via our neighborhood escape technique. The only twist is that we employ an additional stopping criterion, one that stops if the distance between the initial and current solution exceeds some user-defined threshold T. The reason for this is that the assignment changes are indeed expensive to implement, and we don't want to allow wildly different solutions between successive instances of the Static procedure component runs.

Referring to FIG. 9, a detailed embodiment of the Static procedure is shown. Beginning at step 300 we initialize website i to be 1. In step 305 we initialize server j to be 1. In step 310 we determine if server j is feasible for website i. If it is, we proceed to step 320, where we determine whether server j is currently unassigned. If it currently unassigned we assign it in step 325 and increment the website i in step 330. In step 335 we determine whether i is less than or equal to the total number of sites M. If it is, we return to step 305. If the tests in steps 310 or 320 have failed we proceed to step 340, where we increment the server j. In step 345 we determine whether j is less than or equal to the total number of servers N. If it is, we return to step 310. If not, we stop in step 350 with an infeasible solution. Now returning to the case where the sites have been exhausted in step 335 we proceed to step 355, beginning the neighborhood escape component of the procedure. We evaluate the value R of the solution as given by equation (25). In step 360 we set k=1. In step 365 we search the $k^{th}$ ring to evaluate the best possible solution $R_k$. In step 370 we evaluate $R_k$ compared to the best current solution R. If the new value is better we make this the best solution in step 375 and return to step 360. If the new value is not better we increment k in step 380. In step 385 we determine if all rings k have been exhausted. If they have not we return to step 365. Otherwise we stop with the final assignment solution in step 390.

The invention may easily be adapted to automation as by, for example, tangibly embodying a program of instructions upon a storage media, readable by a machine capable of executing the instructions, such as a computer.

It is also to be understood that the term "website" need not restrict the invention to use with hypertext markup language (HTML) documents on the world wide web, but is to be construed to encompass any user network interface capable of receiving customer requests, outputting results, and communicating with a server such as, for example, on a local area networks and the like.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method for controlling a web farm comprising:
   providing a web farm comprising a plurality of different websites and a plurality of web servers, wherein each website is assigned to a set of one or more of the web servers;
   receiving a customer request for accessing a target website of the web farm;
   categorizing the received customer request for the target website as either (i) a shareable customer request which can be processed by a server assigned to another website of the web farm or (ii) an unshareable customer request which can not be processed by a server assigned to another website in the web farm;
   if the received customer request for the target website is categorized as a sharable customer request, routing the customer request to a server assigned to another website which can process the received customer request;
   if the received customer request for the target website is categorized as an unshareable customer request, routing the customer request to a server specifically assigned to the target website for processing, and
   a Goal procedure, said Goal procedure comprising determining, for each said customer request, an optimal server from among said servers to which each said customer request is to be assigned so as to minimize an average customer response time at any given moment, given said assignment of said websites to said servers and a current customer request load, wherein,
   said Goal procedure is effected by minimizing an objective function measuring expected response time as a function of customer request arrival rate subject to a plurality of constraints including a maximum load due to a plurality of public requests for the target website on the server and a plurality of private requests for the target website on the server.

2. The method of claim 1 wherein said Goal procedure is effected by minimizing the objective function $$\sum_{j=1}^{N} R_j \left( \sum_{i=1}^{M} (x_{i,j} + y_{i,j}) \right)$$

subject to the plurality of constraints $$\Sigma(x_{i,j}+y_{i,j}) \in \{0, \ldots, L_j\},$$

$$\sum_{j=1}^{N} x_{i,j} = c_i,$$

$$x_{i,j} = 0 \text{ if } a_{i,j} = 0,$$

$$\sum_{j=1}^{N} y_{i,j} = d_i, \text{ and}$$

$$y_{i,j} = 0 \text{ if } b_{i,j} = 0,$$

where M is the number of websites, N is the number of servers, $R_j$ is the expected response time as a function of customer arrival rate at server j, $x_{i,j}$ is a decision variable representing the number of shareable requests for website i that might be handled by server j, $y_{i,j}$ is a decision variable representing the hypothetical number of unshareable requests for website i that might be handled by server j, $L_j$ is the maximum acceptable load for server j, $c_i$ is the current number of shareable customer requests from website i, $d_i$ is the current number of unshareable requests from website i, $a_{i,j}$ is an index indicating if shareable requests from website i may be routed to server j, and $b_{i,j}$ is an index indicating if unshareable requests from website i may be routed to server j.

3. The method of claim 2 further comprising
   creating and maintaining a directed graph, said directed graph comprising a dummy node and a plurality of server nodes, each said server node corresponding to one of said servers;
   designating one of said sever nodes a winning node for which the expression $$R_j \left( \sum_{i=1}^{M} (x_{i,j} + y_{i,j} + 1) \right) - R_j \left( \sum_{i=1}^{M} (x_{i,j} + y_{i,j}) \right)$$

is minimal; and
   choosing a shortest directed path from said dummy node to said winning node.

4. The method of claim 1 further comprising a Static procedure, said Static procedure comprising assigning specific said websites to specific said servers for the purposes of processing unshareable customer requests.

5. The method of claim 4 wherein said Static procedure assigns said websites to specific servers based upon forecasted demand for shareable and unshareable customer requests from each said website.

6. The method of claim 1 further comprising a Dynamic procedure, said Dynamic procedure comprising:
examining the next customer request;
invoking said Goal procedure in order to determine which server is the optimal server to currently process said next customer request; and
dispatching said next customer request to said optimal server.

7. The method of claim 6 further comprising:
receiving said customer requests into a queue; and
wherein said Dynamic procedure further comprises:
monitoring said customer requests in said queue;
monitoring customer requests currently being processed by said servers;
defining, for each $j^{th}$ server, a function $\dot{R}_j(z)$ by setting $$\dot{R}_j(z) = R_j(z + \Sigma(\ddot{c}_{i,j} + \ddot{d}_{i,j}));$$

defining, for each $j^{th}$ server, a revised acceptable load limit $\dot{L}_j$ by setting $$\dot{L}_j = L_j - \sum_{i=1}^{M}(\ddot{c}_{i,j} + \ddot{d}_{i,j}); \text{ and}$$

invoking said Goal procedure to utilize said $\dot{R}_j(z)$ function and revised acceptable load limit $\dot{L}_j$ to minimize the function $$\sum_{j=1}^{N} \dot{R}_j\left(\sum_{i=1}^{M}(\dot{x}_{i,j} + \dot{y}_{i,j})\right)$$

subject to plurality of constraints:

$$\sum_{i=1}^{M}(\dot{x}_{i,j} + \dot{y}_{i,j}) \in \{0, \ldots, \dot{L}_j\},$$

$$\sum_{j=1}^{N} \dot{x}_{i,j} = \dot{c}_i,$$

$$\dot{x}_{i,j} = 0 \text{ if } a_{i,j} = 0,$$

$$\sum_{j=1}^{N} \dot{y}_{i,j} = \dot{d}_i, \text{ and}$$

$$\dot{y}_{i,j} = 0 \text{ if } b_{i,j} = 0,$$

where $\dot{x}_{i,j}$ is a decision variable representing a number of shareable requests in the queue for website i that might be handled by server j, $\dot{y}_{i,j}$ is a decision variable representing a number of unshareable requests for website i that might be handled by server j, $\dot{c}_i$ is the current number of shareable customer requests in the queue from website i, $\dot{d}_i$ is the current number of unshareable requests in the queue from website i, $\ddot{c}_i$ is the current number of shareable customer requests from website i currently being processed in one of the servers, and $\ddot{d}_i$ is the current number of unshareable requests from website i currently being processed in one of the servers.

8. A program storage device readable by machine, tangibly embodying a program of instructions executable by the machine to perform method steps for controlling a web farm, said method steps comprising:
receiving a customer request for accessing a target website of a web farm having a plurality of different websites and a plurality of web servers, wherein each website is assigned to a set of one or more of the web servers;
categorizing the received customer request for the target website as either (i) a shareable customer request which can be processed by a server assigned to another website of the web farm or (ii) an unshareable customer request which can not be processed by a server assigned to another website in the web farm;
if the received customer request for the target website is categorized as a sharable customer request, routing the received customer request to a server assigned to another website which is can process the received customer request;
if the received customer request for the target website is categorized as an unshareable customer request, routing the received customer request to a server specifically assigned to the target website for processing; and
a Goal procedure, said Goal procedure comprising determining, for each said customer request, an optimal server from among said servers to which each said customer request is to be assigned so as to minimize an average customer response time at any given moment, given said assignment of said websites to said servers and a current customer request load, wherein,
said Goal procedure is effected by minimizing an objective function measuring expected response time as a function of customer request arrival rate subject to a plurality of constraints including a maximum load due to a plurality of public requests for the target website on the server and a plurality of private requests for the target website on the server.

9. The program storage device of claim 8 wherein said Goal procedure is effected by minimizing the objective function $$\sum_{j=1}^{N} R_j\left(\sum_{i=1}^{M}(x_{i,j} + y_{i,j})\right)$$

subject to the plurality of constraints $$\Sigma(x_{i,j} + y_{i,j}) \in \{0, \ldots, L_j\},$$

$$\sum_{j=1}^{N} x_{i,j} = c_i,$$

$$x_{i,j} = 0 \text{ if } a_{i,j} = 0,$$

$$\sum_{j=1}^{N} y_{i,j} = d_i, \text{ and}$$

$$y_{i,j} = 0 \text{ if } b_{i,j} = 0,$$

where M is the number of websites, N is the number of servers, $R_j$ is the expected response time as a function of customer arrival rate at server j, $x_{i,j}$ is a decision variable representing a number of shareable requests for website i that might be handled by server j, $y_{i,j}$ is a decision variable representing a number of unshareable requests for website i that might be handled by server j, $L_j$ is the maximum acceptable load for server j, $c_i$ is the current number of shareable customer requests from website i, $d_i$ is the current number of unshareable requests from website i, $a_{i,j}$ is an index indicating if shareable requests from website i may be routed to server j, and $b_{i,j}$ is an index indicating if unshareable requests from website i may be routed to server j.

10. The program storage device of claim 9 further comprising instructions for:
creating and maintaining a directed graph, said directed graph comprising a dummy node and a plurality of server nodes, each said server node corresponding to one of said servers;
designating one of said sever nodes a winning node for which the expression $$R_j\left(\sum_{i=1}^{M}(x_{i,j}+y_{i,j}+1)\right) - R_j\left(\sum_{i=1}^{M}(x_{i,j}+y_{i,j})\right)$$

is minimal; and
choosing a shortest directed path from said dummy node to said winning node.

11. The program storage device of claim 8 further comprising instructions for performing a Static procedure, said Static procedure comprising assigning specific said websites to specific said servers.

12. The program storage device of claim 11 wherein said Static procedure assigns said websites to specific servers based upon forecasted demand for shareable and unsharable customer requests from each said website.

13. The program storage device of claim 8 further comprising instructions for performing a Dynamic procedure, said Dynamic procedure comprising:
examining the next customer request;
invoking said Goal procedure in order to determine which server is the optimal server to currently process said next customer request; and
dispatching said next customer request to said optimal server.

14. The program storage device of claim 13 further comprising instructions for:
receiving said customer requests into a queue; and
wherein said Dynamic procedure further comprises:
monitoring said customer requests in said queue;
monitoring customer requests currently being processed by said servers;
defining, for each $j^{th}$ server, a function $\dot{R}_j(z)$ by setting $\dot{R}_j(z)=R_j(z+\Sigma(\ddot{c}_{i,j}+\ddot{d}_{i,j}))$;

defining, for each $j^{th}$ server, a revised acceptable load limit $\dot{L}_j$ by setting $$\dot{L}_j = L_j - \sum_{i=1}^{M}(\ddot{c}_{i,j}+\ddot{d}_{i,j}); \text{ and}$$

invoking said Goal procedure to utilize said $\dot{R}_j(z)$ function and revised acceptable load limit $\dot{L}_j$ to minimize the function $$\sum_{j=1}^{N} \dot{R}_j\left(\sum_{i=1}^{M}(\dot{x}_{i,j}+\dot{y}_{i,j})\right)$$

subject to the plurality of constraints:

$$\sum_{i=1}^{M}(\dot{x}_{i,j}+\dot{y}_{i,j}) \in \{0, \ldots, \dot{L}_j\},$$

$$\sum_{j=1}^{N}\dot{x}_{i,j} = \dot{c}_i,$$

$\dot{x}_{i,j} = 0$ if $a_{i,j} = 0$, $$\sum_{j=1}^{N}\dot{y}_{i,j} = \dot{d}_i, \text{ and}$$

$\dot{y}_{i,j} = 0$ if $b_{i,j} = 0$, where $\dot{x}_{i,j}$ is a decision variable representing a number of shareable requests in the queue for website i that might be handled by server j, $\dot{y}_{i,j}$ is a decision variable representing number of unshareable requests for website i that might be handled by server j, $\dot{c}_i$ is the current number of shareable customer requests in the queue from website i, $\dot{d}_i$ is the current number of unshareable requests in the queue from website i, $\ddot{c}_i$ is the current number of shareable customer requests from website i currently being processed in one of the servers, and $\ddot{d}_i$ is the current number of unshareable requests from website i currently being processed in one of the servers.

15. A web farm, comprising:
a plurality of web sites each having one or more servers assigned thereto;
means for receiving customer requests from said plurality of websites;
means for processing said customer requests to produce responses;
means for transmitting said responses to said customers;
means for categorizing said customer requests received from said plurality of websites into a plurality of categories, said categories comprising shareable customer requests which can be processed by servers of different websites and unshareable customer requests which can not be processed by servers of different websites;
a network dispatcher comprising means for executing a Goal procedure, a Static procedure, and a Dynamic procedure;
said Goal procedure comprising determining, for each said customer request, an optimal server from among said servers to which each said customer request is to be assigned so as to minimize an average customer response time at any given moment, given said assignment of said websites to said servers and a current customer request load, wherein said shareable customer requests may be assigned to any said server and wherein said unshareable customer requests may only be assigned to specific servers depending on which said website said unshareable customer request originated;

said Static procedure comprising assigning specific said websites to specific said servers; and said Dynamic procedure comprising:
   examining the next customer request;
   invoking said Goal procedure in order to determine which server is the optimal server to currently process said next customer request;
   dispatching said next customer request to said optimal serve;
   receiving said customer requests into a queue;
   monitoring said customer requests in said queue;
   monitoring customer requests currently being processed by said servers;
   defining, for each server, a convex increasing function and a revised acceptable load limit; and
   invoking said Goal procedure to utilize said convex increasing function and revised acceptable load limit to minimize an objective function measuring expected response time as a function of customer request arrival rate subject to a plurality of constraints including a maximum load for each server due to a number of shareable requests in the queue for said website and a number of unshareable requests for said website.

* * * * *